(12) United States Patent
Sakai et al.

(10) Patent No.: US 10,119,830 B2
(45) Date of Patent: Nov. 6, 2018

(54) CONTROL SYSTEM FOR WORK MACHINE, WORK MACHINE, AND MANAGEMENT SYSTEM FOR WORK MACHINE

(71) Applicant: Komatsu Ltd., Tokyo (JP)

(72) Inventors: Atsushi Sakai, Chigasaki (JP); Daisuke Tanaka, Hiratsuka (JP); Mitsuhiro Ryuman, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 76 days.

(21) Appl. No.: 15/305,669

(22) PCT Filed: Feb. 29, 2016

(86) PCT No.: PCT/JP2016/056121
§ 371 (c)(1),
(2) Date: Oct. 21, 2016

(87) PCT Pub. No.: WO2016/117713
PCT Pub. Date: Jul. 28, 2016

(65) Prior Publication Data
US 2017/0248439 A1    Aug. 31, 2017

(51) Int. Cl.
*G01C 21/36* (2006.01)
*G05D 1/02* (2006.01)

(52) U.S. Cl.
CPC ......... *G01C 21/3667* (2013.01); *G05D 1/021* (2013.01); *G05D 1/0212* (2013.01)

(58) Field of Classification Search
CPC ... G01C 21/3667; G05D 1/021; G05D 1/0212
See application file for complete search history.

(56) References Cited

U.S. PATENT DOCUMENTS 6,539,294 B1 * 3/2003 Kageyama .............. E02F 3/842
  180/168
8,195,342 B2   6/2012 Anderson
  (Continued)

FOREIGN PATENT DOCUMENTS

CN     102269994 A    12/2011
CN     104487996 A     4/2015
  (Continued)

OTHER PUBLICATIONS

International Search Report dated Apr. 26, 2016, issued for PCT/JP2016/056121.
(Continued)

*Primary Examiner* — Ryan Rink
(74) *Attorney, Agent, or Firm* — Locke Lord LLP

(57) ABSTRACT

A control system includes: a detector detecting a position of a work machine running on a running path; a non-contact sensor detecting an object at a side of the running path; a generator generating map data of a work site based on detection data from the detector and the non-contact sensor; a first storage storing past map data generated in the generator based on the detection data from the detector and the non-contact sensor acquired in a predetermined period in a past; a second storage storing current map data generated in the generator based on the detection data from the detector and the non-contact sensor; a first calculator calculating integrated map data by integrating the past map data and the current map data; and a second calculator by matching the integrated map data and the detection data from the non-contact sensor, calculates the position of the work machine.

6 Claims, 11 Drawing Sheets

(56) References Cited

U.S. PATENT DOCUMENTS

| | | | |
|---|---|---|---|
| 8,972,095 B2 | 3/2015 | Furuno et al. | |
| 9,697,654 B2 | 7/2017 | Asada et al. | |
| 9,704,304 B2 | 7/2017 | Asada et al. | |
| 9,836,061 B2 | 12/2017 | Tojima et al. | |
| 2002/0099481 A1 | 7/2002 | Mori | |
| 2007/0198184 A1* | 8/2007 | Yoshioka | G01C 21/32 701/426 |
| 2008/0027591 A1* | 1/2008 | Lenser | G05D 1/0251 701/2 |
| 2008/0304707 A1* | 12/2008 | Oi | G06K 9/00664 382/103 |
| 2010/0324769 A1* | 12/2010 | Takaoka | B25J 9/1676 701/25 |
| 2011/0178669 A1* | 7/2011 | Tanaka | G05D 1/0272 701/25 |
| 2011/0301800 A1 | 12/2011 | Furuno et al. | |
| 2012/0029817 A1* | 2/2012 | Khorashadi | G01C 21/20 701/451 |
| 2013/0223686 A1* | 8/2013 | Shimizu | G08G 1/166 382/103 |
| 2013/0238182 A1 | 9/2013 | Osagawa et al. | |
| 2015/0192488 A1* | 7/2015 | Xu | B63C 11/40 702/38 |
| 2015/0253776 A1 | 9/2015 | Tojima et al. | |
| 2016/0062361 A1 | 3/2016 | Nakano et al. | |
| 2016/0155277 A1 | 6/2016 | Asada et al. | |
| 2016/0224029 A1 | 8/2016 | Tojima et al. | |
| 2016/0300405 A1 | 10/2016 | Asada et al. | |
| 2016/0349753 A1 | 12/2016 | Tojima et al. | |
| 2017/0017238 A1 | 1/2017 | Tojima et al. | |
| 2017/0031367 A1 | 2/2017 | Tojima et al. | |
| 2017/0138729 A1* | 5/2017 | Hung | G05D 1/0238 |
| 2017/0197311 A1* | 7/2017 | Garcia | G01S 15/931 |

FOREIGN PATENT DOCUMENTS

| | | |
|---|---|---|
| CN | 104541217 A | 4/2015 |
| JP | 2002-215236 A | 7/2002 |
| JP | 2010-033077 A | 2/2010 |
| JP | 2011-215474 A | 10/2011 |
| JP | 2012-118694 A | 6/2012 |
| JP | 2014-219721 A | 11/2014 |
| WO | 2015/050279 A1 | 4/2015 |
| WO | 2015/076420 A1 | 5/2015 |
| WO | 2015/097905 A1 | 7/2015 |
| WO | 2015/097907 A1 | 7/2015 |
| WO | 2015/097909 A1 | 7/2015 |

OTHER PUBLICATIONS

Examiner's Report dated Sep. 20, 2017, issued for the corresponding Canadian patent application No. 2,945,926.

* cited by examiner

CONTROL SYSTEM FOR WORK MACHINE, WORK MACHINE, AND MANAGEMENT SYSTEM FOR WORK MACHINE

FIELD

The present invention relates to a control system for a work machine, a work machine, and a management system for a work machine.

BACKGROUND

When a vehicle runs on an ordinary road, there is a case where the vehicle runs while acquiring road information and referring to such road information (see Patent Literature 1). When a mining machine runs in a mining site of a mine, there is a case where the mining machine runs while referring to map data of the mine.

CITATION LIST

Patent Literature

Patent Literature 1: Japanese Laid-open Patent Publication No. 2011-215474

SUMMARY

Technical Problem

A mining site of a mine is vast. Therefore, the data amount of map data of the mine becomes enormous. Accordingly, in order to manage the enormous data amount of the map data, a storage unit with a large capacity is required. Moreover, the state of the mining site of the mine changes day by day in accordance with the mining operation therein. Therefore, a technique for generating appropriate map data corresponding to the change in the state of the mining site is desired.

Aspects of the present invention have an object to provide a control system for a work machine, a work machine, and a management system for a work machine that can suppress a massive increase in the amount of data stored in a storage unit, and can generate appropriate map data corresponding to the current landform of a mining site.

Solution to Problem

According to a first aspect of the present invention, a control system for a work machine, comprises: a position detecting device that detects a position of a work machine that runs on a running path; a non-contact sensor that detects, in a non-contact manner, an object at a side of the running path on which the work machine runs; a map data generating unit that generates map data that indicates a map of a work site based on detection data from the position detecting device and detection data from the non-contact sensor; a first storage unit that stores past map data generated in the map data generating unit based on the detection data from the position detecting device and the detection data from the non-contact sensor acquired in a predetermined period in a past; a second storage unit that stores current map data generated in the map data generating unit based on the detection data from the position detecting device and the detection data from the non-contact sensor; an integrated map data calculation unit that calculates integrated map data by integrating the past map data stored in the first storage unit and the current map data stored in the second storage unit; and a position calculation unit that by matching the integrated map data calculated by the integrated map data calculation unit and the detection data from the non-contact sensor, calculates the position of the work machine.

According to a second aspect of the present invention, a work machine comprises the control system for a work machine according to the first aspect.

According to a third aspect of the present invention, a management system for a work machine comprises a management device that outputs course data that defines the running path to the work machine according to the second aspect.

Advantageous Effects of Invention

According to the aspects of the present invention, there are provided a control system for a work machine, a work machine, and a management system for a work machine that can suppress a massive increase in the amount of data stored in a storage unit, and can generate appropriate map data corresponding to the current landform of a mining site.

DESCRIPTION OF EMBODIMENTS

In the following, embodiments according to the present invention will be described with reference to the drawings. However, the present invention is not limited to these embodiments.

First Embodiment

<Overview of Management System for Mining Machine>

Figure 1:
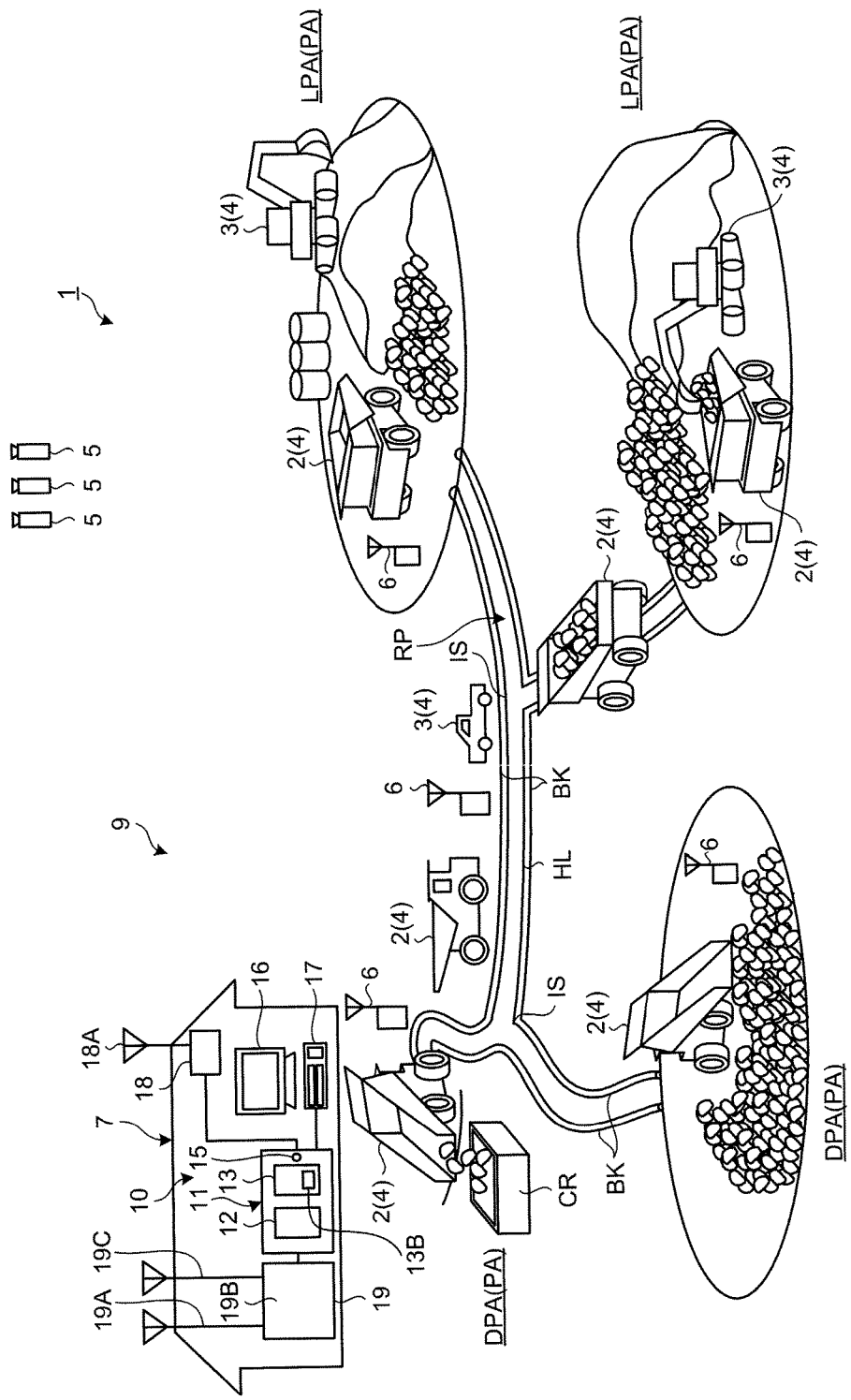
FIG. 1 is a view illustrating an example of a management system for a work machine according to a first embodiment.

FIG. 1 is a view illustrating an example of a management system 1 for a work machine 4 according to a first embodiment. In the first embodiment, an example of the work machine 4 as a mining machine that operates in a mine will be described. In the following description, the work machine 4 is appropriately referred to as a mining machine 4. The work machine 4 may not be a work machine that operates in a mine.

The management system 1 manages the mining machine 4. The management of the mining machine 4 includes at least one of an operational management of the mining machine 4, the evaluation of the productivity of the mining machine 4, the evaluation of an operational technique of an operator on the mining machine 4, the maintenance of the mining machine 4, and the abnormality diagnosis of the mining machine 4.

The mining machine 4 is a generic term for machines used in various work in the mine. The mining machine 4 includes at least one of a boring machine, an excavating machine, a loading machine, a transporting machine, a crusher, and a vehicle in which a worker operates. The excavating machine is a mining machine for excavating a mine. The loading machine is a mining machine for loading a cargo on the transporting machine. The loading machine includes at least one of an excavator, an electric shovel, and a wheel loader. The transporting machine includes a moving body such as a dump truck that can run in the mine. The transporting machine is a mining machine for transporting the cargo. The cargo includes soil and/or ores generated by the mining operation. The crusher crushes soil discharged from the transporting machine.

In the first embodiment, there will be described an example of the management, by the management system 1, of a dump truck 2 which is the transporting machine that can run in the mine. As illustrated in FIG. 1, the dump truck 2 runs in at least a portion of a working area PA and a conveying path HL in the mine. The conveying path HL leads to the working area PA. The working area PA includes a loading area LPA and/or a discharging area DPA. The conveying path HL includes an intersection IS. The dump truck 2 runs on a running path RP set in the mine. An object is provided at the side of the running path RP. In the first embodiment, the object provided at the side of the running path RP is a bank BK. The object provided at the side of the running path RP may be a wall or a structure produced artificially. For example, the object may include a metal or concrete.

The dump truck 2 is a moving body that can run in the mine. The running path RP is set in at least a portion of the loading area LPA, the discharging area DPA, and the conveying path HL.

The loading area LPA is an area in which work of loading the cargo on the dump truck 2 is performed. The discharging area DPA is an area in which work of discharging the cargo from the dump truck 2 is performed. In the first embodiment, a crusher CR is provided in at least a portion of the discharging area DPA.

In the first embodiment, the dump truck 2 autonomously runs on the running path RP based on a command signal from a management device 10, and is a so-called unmanned dump truck. The autonomous running of the dump truck 2 refers to running based on the command signal from the management device 10 without the operation of the worker. However, the dump truck 2 may run by the operation of the worker.

In FIG. 1, the management system 1 is provided with the management device 10, a communication system 9, the dump truck 2, and a mining machine 3. The management device 10 is arranged in a control facility 7 installed in the mine. The mining machine 3 is another mining machine 4 different from the dump truck 2. The management device 10 is installed in the control facility 7 in the mine and does not substantially move. However, the management device 10 may be a movable device. The communication system 9 wirelessly communicates data or command signals among the management device 10, the dump truck 2, and the other mining machine 3. The communication system 9 enables the bidirectional wireless communication between the management device 10 and the dump truck 2, the management device 10 and the other mining machine 3, and the dump truck 2 and the other mining machine 3. In the first embodiment, the communication system 9 includes a plurality of repeaters 6 that relay the data or the command signals (electric waves).

In the first embodiment, the position of the dump truck 2 and the position of the other mining machine 3 are detected using a real time kinematic-global navigation satellite system (RTK-GNSS). The GNSS refers to a global navigation satellite system. A global positioning system (GPS) is an example of the global navigation satellite system. The RTK-GNSS includes a plurality of positioning satellites 5. The RTK-GNSS detects the position defined by coordinate data of the latitude, the longitude, and the altitude. The position detected by the RTK-GNSS is an absolute position defined in the global coordinate system. The position of the dump truck 2 and the position of the other mining machine 3 in the mine are detected by the RTK-GNSS.

In the following description, the position detected by the RTK-GNSS is appropriately referred to as a GPS position. The GPS position is the absolute position, and the coordinate data of the latitude, the longitude, and the altitude. In the RTK-GNSS, the positioning changes depending on at least one of the arrangement of the positioning satellites 5, ionosphere, troposphere, and the landform around antennas that receive data from the positioning satellites 5. The positioning includes a Fix solution (about ±1 cm to 2 cm from the precision), a Float solution (about ±10 cm to several meters from the precision), a Single solution (about ±several meters from the precision), and a non-positioning phase (impossible to calculate positioning).

An XY-coordinate system is defined by the X-axis direction in a horizontal plane and by the Y-axis direction orthogonal to the X-axis direction in the horizontal plane. In the XY-coordinate system, the management system 1 manages the position and orientation of the dump truck 2 and the position and orientation of the other mining machine 3 in the mine. The orientation of the dump truck 2 and the orientation of the other mining machine 3 are managed so that north is zero degree, east is 90 degrees, south is 180 degrees, and west is 270 degrees. The orientation of the dump truck 2 and the orientation of the other mining machine 3 are directions in which the dump truck 2 and the other mining machine 3 run.

<Management Device>

The management device 10 arranged in the control facility 7 will be described. The management device 10 transmits the data and the command signal to the dump truck 2 and receives data from the dump truck 2. As illustrated in FIG. 1, the management device 10 is provided with a computer 11, a display device 16, an input device 17, a wireless communication device 18, and a GPS base station 19.

The computer 11 is provided with a processing device 12, a storage device 13, and an input/output unit (input/output interface) 15. The display device 16, the input device 17, the wireless communication device 18, and the GPS base station 19 are connected to the computer 11 via the input/output unit 15.

The processing device 12 executes various types of processing relating to the management of the dump truck 2 and various types of processing relating to the management of the other mining machine 3. The processing device 12 processes positional data of the dump truck 2 and positional data of the other mining machine 3 acquired via the communication system 9.

The processing device 12 sets the running path RP on which the dump truck 2 runs. The running path RP is defined by course data. The course data is a set of a plurality of points. An absolute position is defined in each of the points. The processing device 12 functions as a course data generating unit that generates the course data of the dump truck 2. The processing device 12 generates the course data, and sets the running path RP.

The storage device 13 is connected to the processing device 12. The storage device 13 stores the various types of data relating to the management of the dump truck 2 and the various types of data relating to the management of the other mining machine 3. In addition, the storage device 13 stores the positional data of the dump truck 2 and the positional data of the other mining machine 3. Moreover, the storage device 13 stores computer programs causing the processing device 12 to execute the various types of processing.

The display device 16 includes a flat panel display such as a liquid crystal display. The display device 16 can display the positional data of the dump truck 2 and the positional data of the other mining machine 3. The input device 17 includes at least one of a keyboard, a touch panel, and a mouse. The input device 17 functions as an operation unit that can input an operational signal to the processing device 12.

The wireless communication device 18 is arranged in the control facility 7. The wireless communication device 18 is a part of the communication system 9. In addition, the wireless communication device 18 is connected to the processing device 12 via the input/output unit 15. The wireless communication device 18 includes an antenna 18A. Moreover, the wireless communication device 18 can receive data transmitted from the dump truck 2 and/or the other mining machine 3. The data received by the wireless communication device 18 is output to the processing device 12, and is stored in the storage device 13. The wireless communication device 18 can transmit data to the dump truck 2 and/or the other mining machine 3.

The GPS base station 19 is arranged in the control facility 7. The GPS base station 19 is provided with an antenna 19A and a transmitting/receiving device 19B. The antenna 19A receives data from the plurality of positioning satellites 5. The transmitting/receiving device 19B is connected to the antenna 19A. The transmitting/receiving device 19B is provided with a receiver, a transmitter, a calculation processing device, and a storage device. The receiver receives the data from the positioning satellites 5 via the antenna 19A. The transmitter transmits the data to the dump truck 2 via an antenna 19C. The calculation processing device includes a microprocessor such as a central processing unit (CPU). The storage device includes a memory such as a read only memory (ROM) or a random access memory (RAM). The transmitting/receiving device 19B calculates a GPS position of the GPS base station 19 based on the data received via the antenna 19A. Then, the transmitting/receiving device 19B generates corrected observation data for correcting the GPS position of the dump truck 2. Thereafter, the transmitting/receiving device 19B transmits the corrected observation data to the dump truck 2 and the other mining machine 3 via the antenna 19C. However, the corrected observation data may be transmitted via the antenna 18A instead of the antenna 19C.

The computer 11 is provided with the input/output unit 15 for communication, a calculation processing device, an external storage device, a main storage device (internal storage device), and an external storage device (auxiliary storage device). The calculation processing device includes a microprocessor such as a central processing unit (CPU) that executes a control program. The external storage device such as a read only memory (ROM) stores the control program. The main storage device such as a random access memory (RAM) is used as a work area of the CPU. In the external storage device such as a nonvolatile memory, data is registered by the CPU. Functions of the processing device 12 are implemented when the CPU reads the control program stored in the ROM and executes the program in the work area of the RAM. Functions of the storage device 13 are implemented when the ROM stores the control program, and when the data is registered in the nonvolatile memory by the CPU. The nonvolatile memory includes a flash memory and/or a hard disk drive, and implements a database 13B. The functions of the processing device 12 and the storage device 13 may be implemented by the cooperation of a plurality of processing circuits.

<Other Mining Machine>

The other mining machine 3 will be described next. The other mining machine 3 is a mining machine other than the dump truck 2, and is operated by the operation of the worker. The other mining machine 3 is provided with a processing device, a GPS receiver, and a wireless communication device. The processing device includes a central processing unit (CPU) and executes various types of processing relating to work contents. The GPS receiver detects a GPS position. The wireless communication device transmits and receives data to/from the wireless communication device 18 of the control facility 7. In the other mining machine 3, the wireless communication device transmits the GPS position to the wireless communication device 18 of the control facility 7 at every predetermined time.

<Dump Truck>

Figure 2:
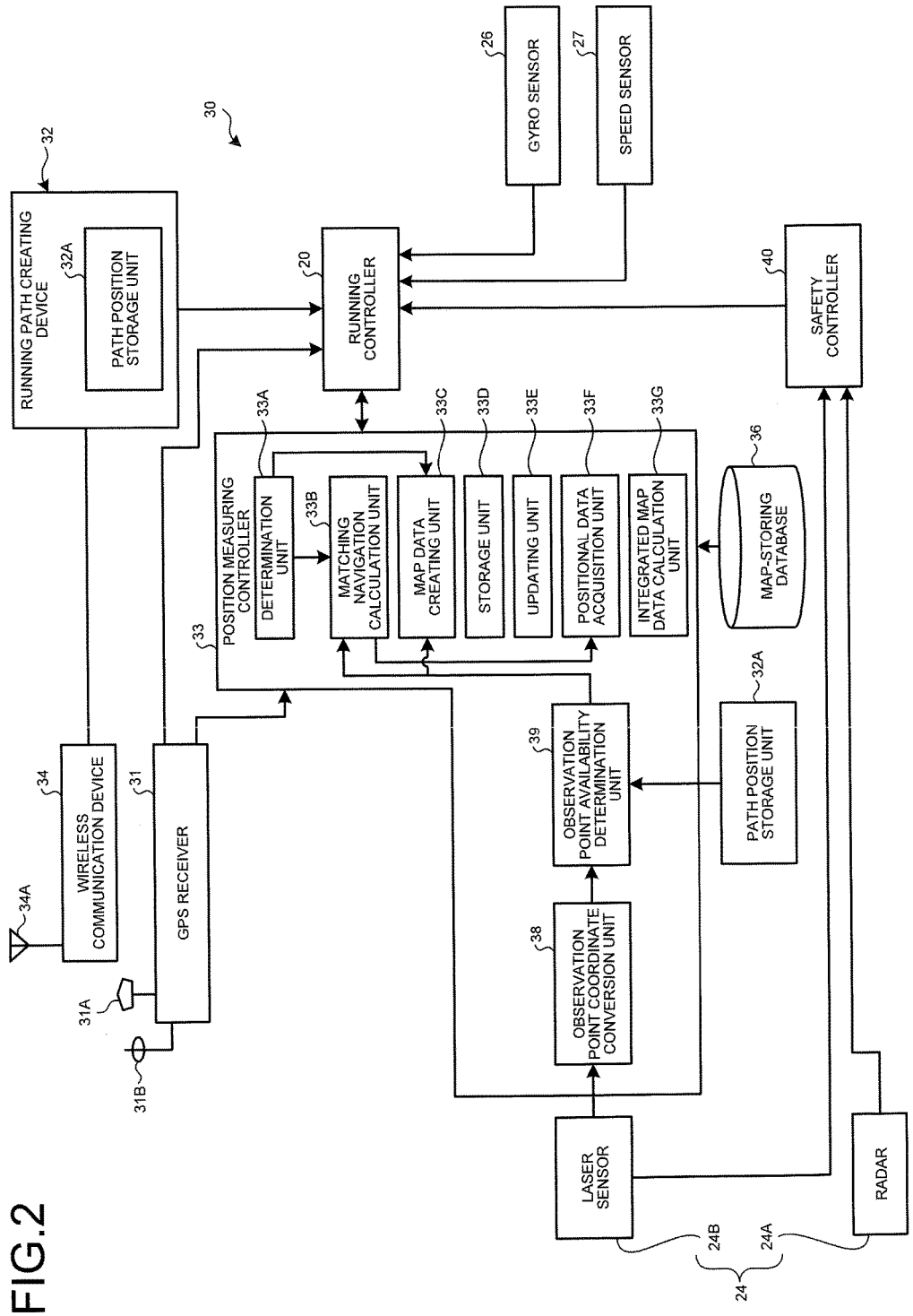
FIG. 2 is a control block diagram of a dump truck according to the first embodiment.
Figure 3:
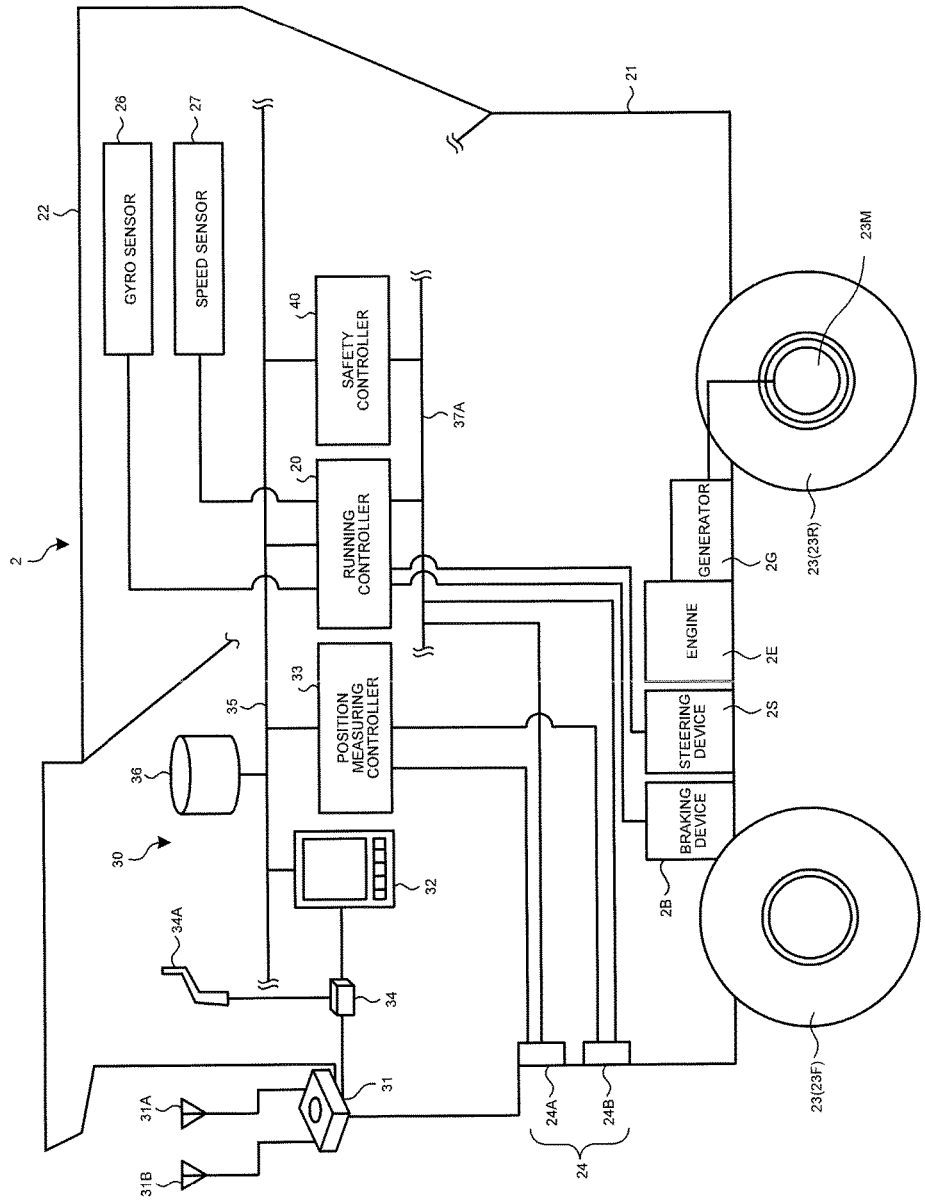
FIG. 3 is a hardware configuration diagram of the dump truck according to the first embodiment.

The dump truck 2 will be described next. FIG. 2 is a control block diagram of the dump truck 2 according to the first embodiment. FIG. 3 is a hardware configuration diagram of the dump truck 2 according to the first embodiment.

As illustrated in FIG. 3, the dump truck 2 is provided with a vehicle main body 21, a vessel 22, wheels 23, a non-contact sensor 24, and a control system 30. An internal combustion engine 2E such as a diesel engine, a generator 2G, and an electric motor 23M are provided in the vehicle main body 21. The generator 2G is operated by the internal combustion engine 2E. The electric motor 23M is operated by the electric power generated by the generator. The wheels 23 include a front wheel 23F and a rear wheel 23R. The rear wheel 23R is driven by the electric motor 23M. The motive power of the internal combustion engine 2E may be transmitted to the rear wheel 23R via a transmission including a torque converter. A steering device 2S that steers the front wheel 23F is provided in the vehicle main body 21. The cargo is loaded on the vessel 22 by the loading machine. In the discharging work, the vessel 22 is raised and the cargo is discharged from the vessel 22.

The non-contact sensor 24 is arranged in a lower portion at the front of the vehicle main body 21. The non-contact sensor 24 detects an object around the dump truck 2 in a non-contact manner. The object around the dump truck 2 includes an object (obstacle) that exists on the running path RP, an object (bank BK) that exists at the side of the running path RP. The non-contact sensor 24 functions as an obstacle sensor that detects an obstacle in front of the dump truck 2 in a non-contact manner.

The non-contact sensor 24 can detect the position of an object relative to the non-contact sensor 24 (dump truck 2). The non-contact sensor 24 includes a radar 24A and a laser sensor 24B. The resolution of the laser sensor 24B is higher than the resolution of the radar 24A.

The non-contact sensor 24 that includes the radar 24A and the laser sensor 24B is connected to a second communication line 37A of the control system 30. The laser sensor 24B is connected to a position measuring controller 33 of the control system 30.

<Control System for Work Machine>

Figure 4:
FIG. 4 is a diagram illustrating a portion of map data stored in a map-storing database of a control system according to the first embodiment.
Figure 4:
Figure 5:
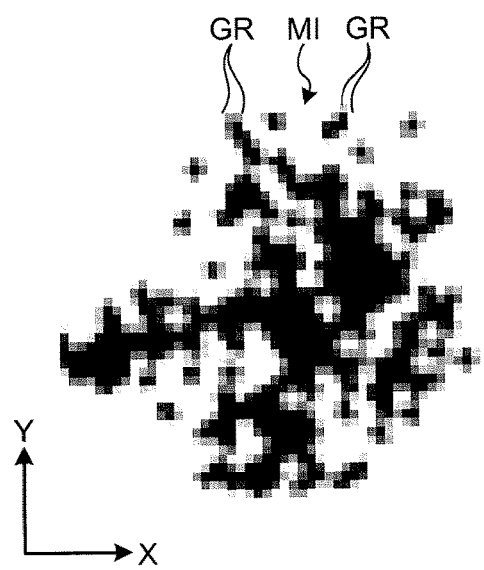
FIG. 5 is a diagram illustrating an enlarged view of an XIV portion in FIG. 4.

The control system 30 for a work machine will be described next. FIG. 4 is a diagram illustrating a portion of map data MI stored in a map-storing database 36 of the control system 30 according to the first embodiment. FIG. 5 is a diagram illustrating an enlarged view of an XIV portion in FIG. 4.

The control system 30 is installed in the dump truck 2. The control system 30 causes the dump truck 2 to autonomously run along the running path RP. As illustrated in FIG. 3, the control system 30 is provided with a gyro sensor 26, a speed sensor 27, a GPS receiver 31, a running path generating device 32, the position measuring controller 33, a running controller 20, the non-contact sensor 24, a wireless communication device 34, and the map-storing database 36. In addition, the control system 30 is provided with a first signal line 35, a second signal line 37, and a safety controller 40.

As illustrated in FIG. 3, the running controller 20, the running path generating device 32, the position measuring controller 33, the map-storing database 36, and the safety controller 40 are connected to the first communication line 35. The data communication among the running controller 20, the running path generating device 32, the position measuring controller 33, the map-storing database 36, and the safety controller 40 is performed via the first communication line 35. The running controller 20 and the safety controller 40 are also connected to the second communication line 37A. The data communication between the running controller 20 and the safety controller 40 is performed via the second communication line 37A. In the first embodiment, the standard of the communication using the first communication line 35 and the second communication line 37A is a controller area network (CAN) standardized as ISO11898 and ISO11519.

The gyro sensor 26 detects the orientation (orientation change amount) of the dump truck 2. The gyro sensor 26 is connected to the running controller 20. The gyro sensor 26 outputs the detection data to the running controller 20. The running controller 20 calculates the orientation (orientation change amount) of the dump truck 2 based on the detection data from the gyro sensor 26.

The speed sensor 27 detects a running speed of the dump truck 2. The speed sensor 27 detects the running speed of the dump truck 2 by detecting a rotational speed of the wheels 23. In addition, the speed sensor 27 is connected to the running controller 20. The speed sensor 27 outputs the detection data to the running controller 20. The running controller 20 calculates a moving distance of the dump truck 2 based on the detection data from the speed sensor 27 and time data measured by a timer built in the running controller 20.

The GPS receiver 31 is provided in the dump truck 2. The GPS receiver 31 is a position detecting device that detects the absolute position (GPS position) of the dump truck 2. An antenna 31A and an antenna 31B are connected to the GPS receiver 31. The antenna 31A receives the data from the positioning satellites 5. The antenna 31B receives the corrected observation data from the GPS base station 19. The antenna 31A outputs a signal based on the data received from the positioning satellites 5 to the GPS receiver 31. The antenna 31B outputs a signal based on the received corrected observation data to the GPS receiver 31. In addition, the GPS receiver 31 detects the position (GPS position) of the antenna 31A using the data from the positioning satellites 5 and the corrected observation data from the GPS base station 19. The GPS receiver 31 compares the data from the positioning satellites 5 with the corrected observation data from the GPS base station 19, and determines the distance to any of the positioning satellites 5. Then, the GPS receiver 31 examines the phase of the electric waves from the positioning satellites 5, and detects the position of the antenna 31A.

The GPS receiver 31 detects the position (GPS position) of the dump truck 2 by detecting the position of the antenna 31A. In a process of detecting the position of the antenna 31A, the GPS receiver 31 detects whether the accuracy is one of the Fix solution, the Float solution, or the Single solution that indicates the accuracy of the detected GPS position based on, for example, the number of the positioning satellites 5 from which the antenna 31A has received the data.

In the first embodiment, the accuracy of the GPS position as the Fix solution is the accuracy with which the dump truck 2 can autonomously run. In addition, the accuracy of the GPS position as the Float solution and the accuracy of the GPS position as the Single solution are the accuracy with which the dump truck 2 cannot autonomously run. When the Fix solution, the Float solution, or the Single solution that indicates the accuracy of the detected GPS position is detected, the GPS receiver 31 outputs a positioning signal that indicates that the positioning of the GPS position has been calculated while indicating the accuracy of the GPS position. On the other hand, when the positioning of the GPS position is impossible to calculate, the GPS receiver 31 outputs a non-positioning signal that indicates the non-positioning phase. The positioning signal or the non-positioning signal is output to the running controller 20 and the position measuring controller 33 via the running path generating device 32.

As illustrated in FIG. 2, the running path generating device 32 includes a path position storage unit 32A that stores course data generated by the processing device 12 of the management device 10. The running path generating device 32 is connected to the wireless communication device 34 connected to an antenna 34A. The wireless communication device 34 can receive the command signal or the data transmitted from the management device 10 and/or the mining machine 4 other than its own machine. The mining machine 4 other than its own machine includes a mining machine 4 other than a boring machine, an excavating machine, a loading machine, a transporting machine, and a dump truck 2 which is a vehicle or the like operated by a worker, and includes a dump truck 2 other than its own truck.

The wireless communication device 34 receives the course data transmitted from the wireless communication device 18 of the control facility 7 and the positional data of the mining machine 4 other than its own machine. Then, the wireless communication device 34 outputs the received data to the running path generating device 32 and the position measuring controller 33. The course data and the positional data of the mining machine 4 other than its own machine are defined in the XY-coordinate system. The running path generating device 32 receives the course data and the positional data of the mining machine 4 other than its own machine from the wireless communication device 34, and stores the received data in the path position storage unit 32A. In addition, the running path generating device 32 transmits the positional data and the orientation data of the dump truck 2, which is its own truck detected by the running controller 20 or a matching navigation calculation unit 33B of the position measuring controller 33, to the wireless communication device 18 of the control facility 7 via the wireless communication device 34. The running path generating device 32 is connected to the first communication line 35.

The running path generating device 32, the running controller 20, and the position measuring controller 33 include computers. The computers operate in accordance with corresponding read computer programs.

The running controller 20 receives the positional data that indicates the GPS position of the dump truck 2 detected by the GPS receiver 31, and the positional data that indicates the absolute position of the dump truck 2 calculated by the matching navigation calculation unit 33B of the position measuring controller 33. The running controller 20 causes the dump truck 2 to autonomously run along the running path RP defined by the course data based on the positional data that indicates the GPS position of the dump truck 2 detected by the GPS receiver 31 and/or the positional data that indicates the absolute position of the dump truck 2 calculated by the matching navigation calculation unit 33B of the position measuring controller 33.

The running controller 20 acquires not only the positional data of the dump truck 2 but also the orientation data that indicates the orientation (orientation change amount) of the dump truck 2 which is the detection data from the gyro sensor 26, and running speed data that indicates the running speed of the dump truck 2 which is the detection data from the speed sensor 27.

The running controller 20 calculates the position and the orientation of the dump truck 2 based on the positional data of the dump truck 2 which is the detection data from the GPS receiver 31, the running speed data of the dump truck 2 which is the detection data from the speed sensor 27, and the orientation data of the dump truck 2 which is the detection data from the gyro sensor 26. The running controller 20 detects the position and the orientation by integrating the running speed, which is the detection result from the speed sensor 27, by time data from a timer, based on the GPS position at the time the GPS position has been input from the GPS receiver 31 and the orientation which is the detection result from the gyro sensor 26. The running controller 20 converts the GPS position into a position in the XY-coordinate system in any of before, during, or after the detection of the position and the orientation.

The running controller 20 controls at least one of an accelerator, a braking device 23B, and the steering device 2S of the dump truck 2 so that the position of the dump truck 2 overlaps the running path RP, that is, the dump truck 2 runs along the running path RP. By such control, the running controller 20 causes the dump truck 2 to run along the running path RP. Functions of the running controller 20 are implemented when the CPU reads the control program stored in the ROM and executes the program in the work area of the RAM. The functions of the running controller 20 may be implemented by the cooperation of a plurality of processing circuits.

As illustrated in FIG. 2, the position measuring controller 33 is provided with a determination unit 33A, the matching navigation position calculation unit 33B, a map data generating unit 33C, a storage unit 33D, an updating unit 33E, a positional data acquisition unit 33F, and an integrated map data calculation unit 33G.

The position measuring controller 33 is connected to the first communication line 35. The position measuring controller 33 acquires the detection data from the gyro sensor 26 and the detection data from the speed sensor 27 via the first communication line 35 and running controller 20. In addition, the position measuring controller 33 is connected to the GPS receiver 31 via the wireless communication device 34, the running path generating device 32, and the first communication line 35. Moreover, the position measuring controller 33 acquires the detection data from the GPS receiver 31.

When the dump truck 2 runs on the running path RP, the position measuring controller 33 generates the map data MI of the running path RP, which includes positional data of the bank BK outside the running path RP detected by the laser sensor 24B, based on the positional data of the dump truck 2 detected by the GPS receiver 31 and the positional data of the bank BK. Then, the position measuring controller 33 stores the map data MI in the map-storing database 36.

The determination unit 33A determines whether the detection accuracy of the GPS position detected by the GPS receiver 31 exceeds a predetermined accuracy, that is, whether the detection accuracy of the GPS position is high. The determination unit 33A determines whether the solution of the GPS position is the Fix solution. When the solution of the GPS position is the Fix solution, the determination unit 33A determines that the detection accuracy of the detected GPS position of the dump truck 2 is high. On the other hand, when the solution of the GPS position is the Float solution or the Single solution, or when the GPS position is in the non-positioning phase, the determination unit 33A determines that the detection accuracy of the detected GPS position of the dump truck 2 is low. The predetermined accuracy is the accuracy of the GPS position in which the dump truck 2 can autonomously run along the running path RP by dead reckoning described later. In the first embodiment, the GPS receiver 31 detects the GPS position and the solution; however, the solution may be detected by other equipment (such as the determination unit 33A).

When the determination unit 33A determines that the detection accuracy of the GPS position of the dump truck 2 detected by the GPS receiver 31 exceeds the predetermined accuracy (that is, the detection accuracy is high), the map data generating unit 33C detects the position of the bank BK provided on at least one of the outside of the loading area LPA, outside of the discharging area DPA, and outside of the conveying path HL based on the detection result from the gyro sensor 26, the detection result from the speed sensor 27, and the detection result from the laser sensor 24B. Then, the map data generating unit 33C stores the positional data of the bank BK as the map data MI of the running path RP in the map-storing database 36. In addition, the map data generating unit 33C integrates the position and the orientation of the dump truck 2 detected by the determination unit 33A and the detection result from the laser sensor 24B. Then, the map data generating unit 33C deletes the detection result other than the bank BK from the integrated data, and detects the position of the bank BK. Thereafter, the map data generating unit 33C stores the resultant data in the map-storing database 36. As illustrated in FIGS. 4 and 5, in a plan view, the map data MI indicates the position of a grid GR in the XY-coordinate system where the mine is divided into quadrangles (rectangular or square) with predetermined sizes, and indicates whether the bank BK exists in each grid GR. The grid GR of the map data MI includes data of whether the bank BK exists, i.e., binary data of "0" or "1" (one-bit data). As illustrated in FIGS. 4 and 5, in the first embodiment, the grid GR of the map data MI is represented in a black square in the drawing when the bank BK exists, i.e., the binary data of "1", and represented in a white square in the drawing when the bank BK does not exist, i.e., the binary data of "0".

The map-storing database 36 stores the positional data of the bank BK as the map data MI of the running path RP. The map-storing database 36 is connected to the first communication line 35. The map-storing database 36 is an external storage device (auxiliary storage device) that includes at least one of a read only memory (ROM), a flash memory, and a hard disk drive. When the determination unit 33A determines that the detection accuracy of the GPS position of the dump truck 2 detected by the GPS receiver 31 exceeds the predetermined accuracy, the map-storing database 36 extracts the detection result relating to the bank BK that surrounds the running path RP from the detection result from the laser sensor 24B. Then, the map-storing database 36 stores the extracted detection result relating to the bank BK as the map data MI of the running path RP. In addition, the map-storing database 36 stores the detection result detected by the map data generating unit 33C as the map data MI each time the map data generating unit 33C detects the detection result. In the first embodiment, the map data MI stored in the map-storing database 36 is overwritten each time the map data generating unit 33C detects the detection result; however, the present invention is not limited to this.

The storage unit 33D is a main storage device (internal storage device) in which an operation speed is faster than the map-storing database 36. The storage unit 33D includes a random access memory (RAM).

The updating unit 33E causes the storage unit 33D to read at least a part of the map data MI stored in the map-storing database 36.

The integrated map data calculation unit 33G integrates the map data MI generated in a predetermined period in the past and stored in the map-storing database 36, and the map data MI stored in the storage unit 33D. Then, the integrated map data calculation unit 33G calculates the integrated map data.

When the determination unit 33A determines that the detection accuracy of the GPS position of the dump truck 2 detected by the GPS receiver 31 exceeds the predetermined accuracy (that is, the detection accuracy is high), the matching navigation calculation unit 33B calculates the position and the orientation of the dump truck 2 based on the detection result from the gyro sensor 26, the detection result from the speed sensor 27, the detection result from the laser sensor 24B, and the map data MI read into the storage unit 33D from the map-storing database 36 and stored in the storage unit 33D.

The positional data acquisition unit 33F acquires the positional data that indicates the absolute position of the dump truck 2. The positional data that indicates the absolute position of the dump truck 2 is detected by the GPS receiver 31. In addition, the positional data that indicates the absolute position of the dump truck 2 is calculated by the matching navigation calculation unit 33B. The positional data acquisition unit 33F acquires the positional data that indicates the absolute position of the dump truck 2 from the GPS receiver 31 and/or the matching navigation calculation unit 33B.

When the running path generating device 32 receives the course data from the wireless transmission device 34, the position measuring controller 33 transmits the positional data and the orientation data of the dump truck 2, which is its own truck detected by the GPS receiver 31 or the matching navigation calculation unit 33B, to the wireless communication device 18 of the control facility 7 via the wireless communication device 34.

As illustrated in FIG. 2, the position measuring controller 33 is provided with an observation point coordinate conversion unit 38 and an observation point availability determination unit 39. The observation point coordinate conversion unit 38 converts, into the XY-coordinate system, the position of the detection result from the laser sensor 24B indicated by the coordinates defined by the direction and the distance from the laser sensor 24B. The position of the detection result into which the coordinates have been converted by the observation point coordinate conversion unit 38 is defined by, in addition to the X-axis direction and the Y-axis direction, the height direction (Z-axis direction) orthogonal to the X-axis direction and the Y-axis direction. The observation point availability determination unit 39 acquires the positional data of the mining machine 4 other than its own machine from the path position storage unit 32A. The observation point availability determination unit 39 removes, from the detection result into which the coordinates have been converted by the observation point coordinate conversion unit 38, various types of noise, the detection result less than or equal to a predetermined height from the ground, and the detection result expected to detect the mining machine 4 other than its own machine. The observation point availability determination unit 39 combines the detection result from the laser sensor 24B from which the noise has been removed with the detection result from the grid GR. The observation point availability determination unit 39 outputs the combined detection result to the map data generating unit 33C and to the matching navigation calculation unit 33B.

The safety controller 40 determines the relative position between the dump truck 2 and the object (obstacle) based on detection signals from the radar 24A and the laser sensor 24B, and outputs the determined position to the running controller 20. The running controller 20 prevents, using the position relative to the object, the dump truck 2 from colliding with the object by generating a command for controlling at least one of the accelerator, the braking device 23B, and the steering device 2S and then, controlling the dump truck 2 based on such command.

When the determination unit 33A determines that the solution of the GPS position is the Float solution or the Single solution, or when a predetermined time has elapsed while the GPS position has been in the non-positioning phase and the matching navigation calculation unit 33B can only acquire the detection data by the laser sensor 24B in which an estimated accuracy and the reliability of the map data MI stored in the map-storing database 36 are lower than a predetermined value and predetermined reliability, respectively, the running controller 20 outputs, to the running controller 20, a command for controlling the braking device 23B that stops the vehicle main body 21.

<Running Mode of Dump Truck 2>

Figure 6:
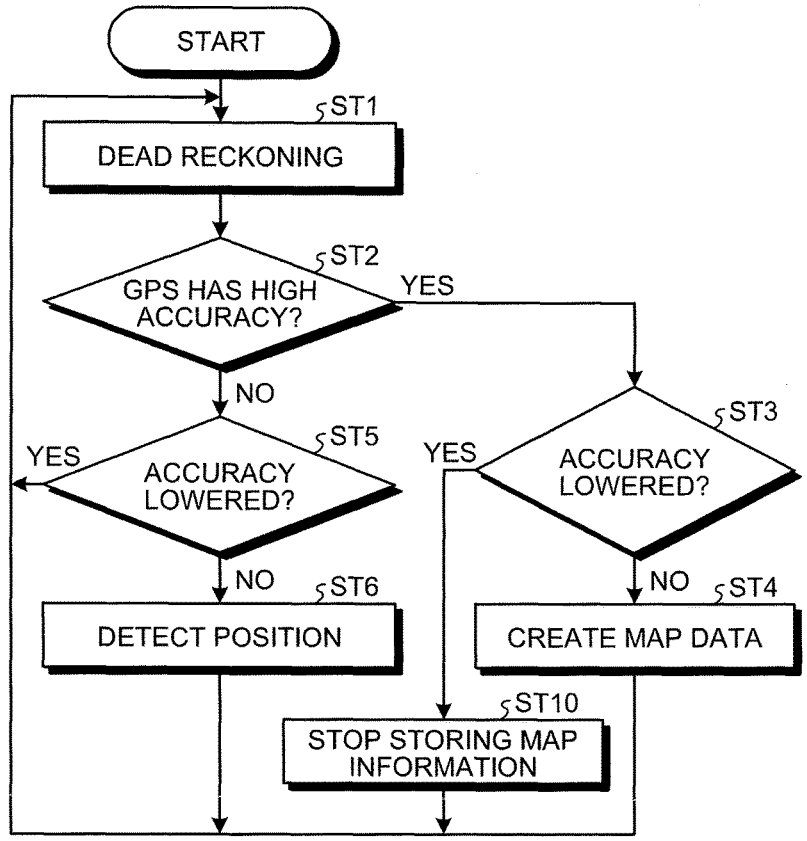
FIG. 6 is an example of a flowchart of the control system according to the first embodiment.
Figure 7:
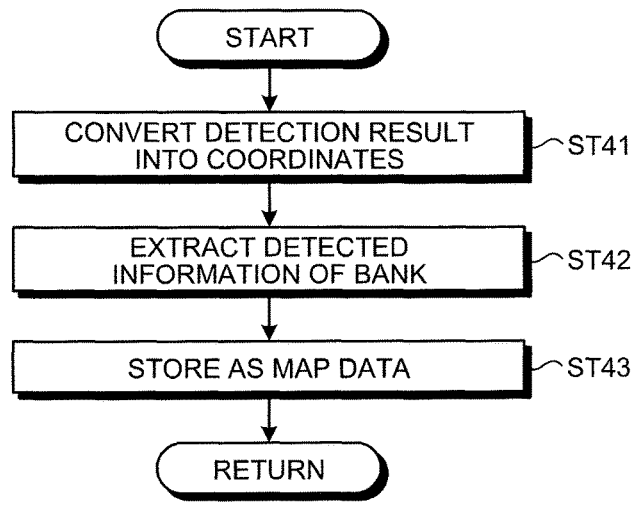
FIG. 7 is an example of a flowchart of step ST4.
Figure 8:
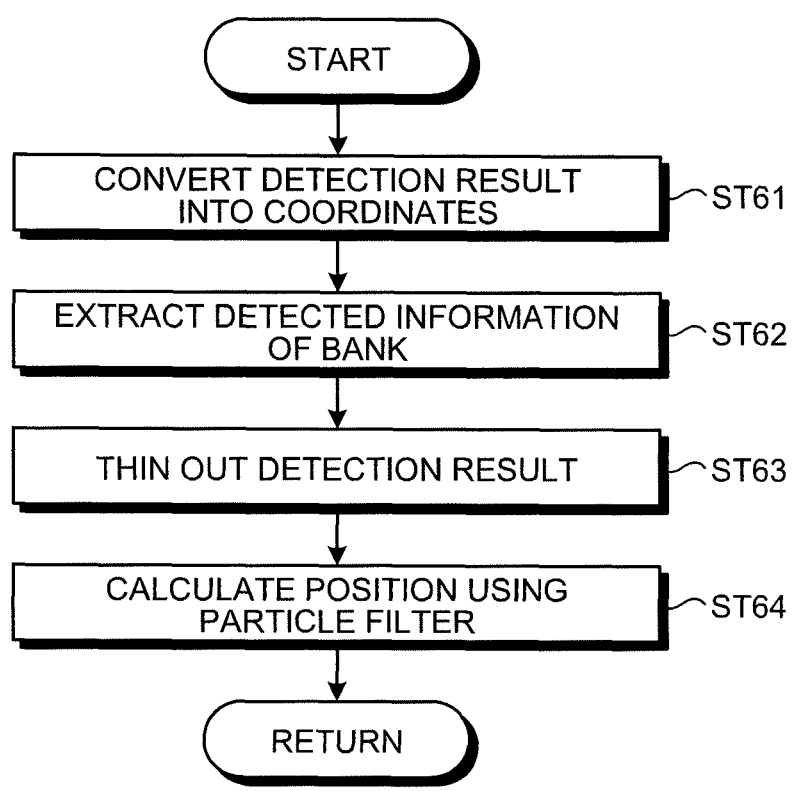
FIG. 8 is an example of a flowchart of step ST6.

An example of the running mode of the dump truck 2 according to the first embodiment will be described next. FIG. 6 is an example of a flowchart of the control system 30 according to the first embodiment. FIG. 7 is an example of a flowchart of step ST4 in FIG. 6. FIG. 8 is an example of a flowchart of step ST6 of FIG. 6.

In order to cause the dump truck 2 to run along the running path RP, the processing device 12 transmits command signals to the running path generating device 32 and the position measuring controller 33 of the dump truck 2 via the wireless communication device 18. The command signals include running conditional data that indicates the running condition of the dump truck 2 and the positional data of the mining machine 4 other than its own machine. The running conditional data includes the course data generated by the processing device 12 and the running speed data of the dump truck 2. The running path generating device 32 stores, among the command signals transmitted from the processing device 12 via the communication system 9, the course data and the positional data of the mining machine 4 other than its own machine in the path position storage unit 32A. When the running path generating device 32 receives the command signals from the processing device 12, the position measuring controller 33 transmits the positional data and the orientation data of the dump truck 2, which is its own truck, to the processing device 12 via the wireless communication device 34. Based on the command signals from the processing device 12, the running controller 20 controls the accelerator, the braking device 23B, and the steering device 2S of the dump truck 2 and thus, controls the running of the dump truck 2.

In the first embodiment, the management device 10 causes the dump truck 2 to run along the running path RP usually in three running modes. A first running mode is a dead reckoning running mode in which the dump truck 2 runs based on the dead reckoning. A second running mode is a GPS running mode in which the dump truck 2 runs based on the detection data from the GPS receiver 31. A third running mode is a matching navigation running mode. In the matching navigation running mode, the positional data that indicates the absolute position of the dump truck 2 is calculated based on the map data MI and the detection data from the non-contact sensor 24 and accordingly, the dump truck 2 runs based on such calculated positional data of the dump truck 2. In addition, in the matching navigation running mode, the positional data of the dump truck 2 is calculated in the matching navigation calculation unit 33B. When the dump truck 2 runs in the matching navigation running mode, map data generation processing is performed, and the map data MI generated by the map data generation processing is stored in the map-storing database 36.

The dead reckoning is a navigation of estimating the current position of an object (dump truck 2) based on the orientation (orientation change amount) and the moving distance of the object from a known position. The orientation (orientation change amount) of the dump truck 2 is detected using the gyro sensor 26 arranged in the dump truck 2. The moving distance of the dump truck 2 is detected using the speed sensor 27 arranged in the dump truck 2. A detection signal from the gyro sensor 26 and a detection signal from the speed sensor 27 are output to the running controller 20 of the dump truck 2.

The running controller 20 can determine the orientation (orientation change amount) of the dump truck 2 from a known starting point based on the detection signal from the gyro sensor 26. The running controller 20 can determine the moving distance of the dump truck 2 from the known starting point based on the detection signal from the speed sensor 27. The running controller 20 generates a control amount relating to the running of the dump truck 2, based on the detection signal from the gyro sensor 26 and the detection signal from the speed sensor 27, so that the dump truck 2 runs in accordance with the course data set on the running path RP. The control amount includes an accelerator signal, a braking signal, and a steering signal. The running controller 20 controls the running (operation) of the dump truck 2 based on the steering signal, the accelerator signal, and the braking signal.

When the distance of the dump truck 2 running by the dead reckoning becomes longer, an error possibly occurs between the position that has been estimated (estimated position) and the actual position due to the accumulation of detection errors of the gyro sensor 26 and/or the speed sensor 27. As a result, the dump truck 2 possibly runs out of the course data generated by the processing device 12. In the first embodiment, the running controller 20 causes the dump truck 2 to run while correcting the position (estimated position) of the dump truck 2 derived (estimated) by the dead reckoning using the GPS positional data detected by the GPS receiver 31 or the positional data calculated by the matching navigation calculation unit 33B.

That is, in the first embodiment, the dump truck 2 runs by combining the dead reckoning running mode with the GPS running mode and/or the matching navigation running mode. The dump truck 2 may run only in the dead reckoning running mode, only in the GPS running mode, or only in the matching navigation running mode.

The running controller 20 calculates the control amount relating to the running of the dump truck 2 that includes a correction amount for correcting the position of the dump truck 2, based on the detection signal from the gyro sensor 26, the detection signal from the speed sensor 27, and the GPS position from the GPS receiver 31 or the position detected by the matching navigation calculation unit 33B, so that the dump truck 2 runs along the running path RP defined by the course data. The running controller 20 controls the running (operation) of the dump truck 2 based on the calculated correction amount and control amount, so that the dump truck 2 runs along the running path RP.

The running controller 20 of the control system 30 executes step ST1, based on the GPS position of the dump truck 2 detected by the GPS receiver 31, for causing the dump truck 2 to run by the dead reckoning in accordance with the course data set in the running path RP. In the first embodiment, the running controller 20 causes the dump truck 2 to run in at least a portion of the loading area LPA, the discharging area DPA, and the conveying path HL in accordance with the course data generated by the processing device 12 of the management device 10 and with the running conditional data that includes the running speed (target running speed) set in the processing device 12.

The determination unit 33A of the position measuring controller 33 executes step ST2 for determining whether the detection accuracy of the GPS position of the dump truck 2 detected by the GPS receiver 31 exceeds the predetermined accuracy. That is, in step ST2, the determination unit 33A of the position measuring controller 33 determines whether the accuracy of the GPS position of the dump truck 2 detected by the GPS receiver 31 is high. Specifically, the determination unit 33A of the position measuring controller 33 determines whether the solution of the GPS position detected by the GPS receiver 31 is the Fix solution. Upon determining that the solution of the GPS position detected by the GPS receiver 31 is the Fix solution, that is, the detection accuracy of the GPS position of the dump truck 2 detected by the GPS receiver 31 is high (step ST2: Yes), the determination unit 33A of the position measuring controller 33 determines whether the state of the dump truck 2 reduces the accuracy of the map data MI, that is, whether the detected data relating to the position of the bank BK reduces the accuracy of the map data MI stored in the map-storing database 36 (step ST3). Specifically, in the first embodiment, the determination unit 33A of the position measuring controller 33 determines, based on the detection signal from the speed sensor 27, whether the running speed of the dump truck 2 is zero, that is, whether the dump truck 2 is stopped in which case the state of the dump truck 2 reduces the accuracy of map data MI. This is because when the dump truck 2 is stopped, that is, the running speed is zero, due to the dust or the like generated by, for example, operating the mining machine 4 other than its own machine, noise may get mixed in the map information MI and may reduce the accuracy of the map information MI.

When the determination unit 33A of the position measuring controller 33 determines that the dump truck 2 is not stopped, that is, the state of the dump truck 2 does not reduce the accuracy of the map data MI (step ST3: No), the map data generation processing is performed by the map data generating unit 33C. The map data generating unit 33C generates the map data MI (step ST4). In other words, when the detection accuracy of the GPS position detected by the GPS receiver 31 is determined to be high, the position measuring controller 33 causes the dump truck 2 to autonomously run in accordance with the course data stored in the path position storage unit 32A based on the GPS position of the dump truck 2 detected by the GPS receiver 31. In addition, the position measuring controller 33 executes step ST4 for extracting the detection result relating to the bank BK from the detection result from the laser sensor 24B, and storing the extracted detection result relating to the bank BK as the map data MI of the running path RP in the map-storing database 36. Specifically, the observation point coordinate conversion unit 38 converts the position of the detection result from the laser sensor 24B indicated by the coordinates defined by the direction and the distance from the laser sensor 24B into the position of the coordinates indicated in the X-Y coordinates (step ST41).

Then, the observation point availability determination unit 39 extracts the detection result relating to the bank BK from the detection result into which the coordinates have been converted by the observation point coordinate conversion unit 38 (step ST42). In order to extract the detection result relating to the bank BK, the observation point availability determination unit 39 removes the various types of noise in the detection result into which the coordinates have been converted by the observation point coordinate conversion unit 38.

The observation point availability determination unit 39 combines the detection result, from which the various types of noise have been removed, with the detection result that is indicated by the position in the XY-coordinate system and includes the grid GR with a predetermined size. The observation point availability determination unit 39 outputs the combined detection result to the map data generating unit 33C and to the matching navigation calculation unit 33B. The map data generating unit 33C of the position measuring controller 33 stores the position of the bank BK, which is the detection result combined by the observation point availability determination unit 39, as the map data MI of the running path RP in the map-storing database 36 (step ST43). By executing step ST1 to step ST4, the control system 30 continues to extract the detection result relating to the bank BK from the detection result from the laser sensor 24B and to store the extracted detection result relating to the bank BK as the map data MI of the running path RP. Such processing continues while the detection accuracy of the GPS position of the dump truck 2 detected by the GPS receiver 31 is high, and while the speed sensor 27 keeps detecting that the dump truck 2 is not stopped, that is, while the state of the dump truck 2 is determined as not reducing the accuracy of the map data MI.

When the determination unit 33A of the position measuring controller 33 determines that the dump truck 2 is stopped, that is, the state of the dump truck 2 reduces the accuracy of the map data MI (step ST3: Yes), the storage of the map data MI is stopped (step ST10), and the process returns to step ST1. As described above, a ROM (external storage device) 333 of the position measuring controller 33 stores a program for causing the position measuring controller 33, which is a computer, to execute step ST3, step ST4, and step ST10. In the control system 30, when the determination unit 33A determines that the state of the dump truck 2 reduces the accuracy of the map data MI (step ST3: Yes), the storage of the map data MI is stopped (step ST10), and the process returns to step ST1. As a result, the map-storing database 36 stops storing the map data MI in the running path RP while the speed sensor 27 detects that the dump truck 2 is stopped, that is, while the state of the dump truck 2 reduces the accuracy of the map data MI.

On the other hand, upon determining that the solution of the GPS position detected by the GPS receiver 31 is the non-Fix solution, that is, the detection accuracy of the GPS position of the dump truck 2 detected by the GPS receiver 31 is not high (step ST2: No), the determination unit 33A of the position measuring controller 33 determines whether the state of the dump truck 2 reduces the positional measuring accuracy, that is, whether the data relating to the position of the bank BK detected by a grid map generating unit 33C reduces the positional measuring accuracy stored in the map-storing database 36 (step ST5). Specifically, in the first embodiment, the determination unit 33A of the position measuring controller 33 determines whether the running speed of the dump truck 2 is zero based on the detection signal from the speed sensor 27, that is, whether the dump truck 2 is stopped in which case the state of the dump truck 2 reduces the positional measuring accuracy. This is because when the dump truck 2 is stopped, that is, the running speed is zero, due to the dust or the like generated by, for example, operating the mining machine 4 other than its own machine, noise may get mixed in the detection result from the laser sensor 24B and may reduce the positional measuring accuracy of the matching navigation calculation unit 33B. Moreover, when the dump truck 2 is stopped, that is, the running speed is zero, the position of the dump truck 2 does not change.

When the determination unit 33A of the position measuring controller 33 determines that the dump truck 2 is not stopped, that is, the state of the dump truck 2 does not reduce the positional measuring accuracy (step ST5: No), the matching navigation calculation unit 33B calculates the position and the orientation of the dump truck 2 and causes the dump truck 2 to perform matching navigation running along the running path RP based on the detection data from the laser sensor 24B and the map data MI stored in the map-storing database 36 and read into the storage unit 33D (step ST6). In other words, when the detection accuracy of the GPS position detected by the GPS receiver 31 is determined to be not high, the position measuring controller 33 detects the position and the orientation of the dump truck 2 by matching the detection result from the laser sensor 24B and the map data MI stored in the map-storing database 36.

Specifically, the observation point coordinate conversion unit 38 converts the position of the detection result from the laser sensor 24B indicated by the coordinates defined by the direction and the distance from the laser sensor 24B into the position in the X-Y coordinates (step ST61). Then, the observation point availability determination unit 39 extracts the detection result relating to the bank BK from the detection result into which the coordinates have been converted by the observation point coordinate conversion unit 38 (step ST62). Since step ST61 is the same process as step ST41 and step ST62 is the same process as step ST42, the detailed description thereof is omitted.

The matching navigation calculation unit 33B puts the detection result, from which the noise has been removed by the observation point availability determination unit 39, through an isolation filter, and thins out the detection result (step ST63). Specifically, the matching navigation calculation unit 33B keeps only the detection result apart in a predetermined distance and removes the rest of the detection results among the detection results from which the noise has been removed by the observation point availability determination unit 39. By the process performed in step ST63, the detection result from the laser sensor 24B is reduced to one-fifth to one-sixth.

The matching navigation calculation unit 33B integrates, using a particle filter PF, the detection data from the gyro sensor 26, the detection data from the speed sensor 27, the detection data from the laser sensor 24B, and the map data MI stored in the map-storing database 36 and read into the storage unit 33D and thereafter, calculates the position and the orientation of the dump truck 2 (step ST64). A plurality of the calculated positions and orientation are used as the positions and orientation to be calculated in step ST641 when step ST6 is executed again.

When the calculated position and orientation of the dump truck 2 do not match any of the one detected from the detection result detected when the laser sensor 24B has been out of order, one detected from the detection result detected when the gyro sensor 26 has been out of order, one detected from the detection result from the laser sensor 24B less than the predetermined number, and one detected using the map data MI with the reliability lower than the predetermined reliability, the likelihood lower than the predetermined value, the estimated accuracy lower than the predetermined value, the difference between the position and orientation by the dead reckoning larger than the predetermined values, and with problems, the matching navigation calculation unit 33B executes the dead reckoning (step ST1) using the detected positions and orientation, and the position measuring controller 33 controls the running (operation) of the dump truck 2 so that the dump truck 2 runs along the running path RP. Accordingly, by executing step ST1, step ST2, step ST5, and step ST6, the control system 1 continues detecting the position and the orientation of the dump truck 2 by matching the detection result from the laser sensor 24B and the map data MI of the running path RP stored in the map-storing database 36, when the detection accuracy of the GPS position of the dump truck 2 detected by the GPS receiver 31 is not high and while the speed sensor 27 detects that the dump truck 2 is not stopped, that is, while the state of the dump truck 2 does not reduce the position measuring accuracy. In addition, the running controller 20 causes the dump truck 2 to run along the running path RP based on the position and the orientation of the dump truck 2 detected by the position measuring controller 33.

When the determination unit 33A of the position measuring controller 33 determines that the dump truck 2 is stopped, that is, the state of the dump truck 2 reduces the position measuring accuracy (step ST5: Yes), the process returns to step ST1. When the determination unit 33A determines that the state of the dump truck 2 reduces the position measuring accuracy (step ST5: Yes), the process returns to step ST1. As a result, by matching the detection result from the laser sensor 24B and the map data MI of the running path RP stored in the map-storing database 36, the position measuring controller 33 stops detecting the position and the orientation of the dump truck 2 while the speed sensor 27 detects that the dump truck 2 is stopped, that is, while the state of the dump truck 2 reduces the position measuring accuracy.

<Management and Construction of Map Data>

As described above, when the dump truck 2 runs on the running path RP, the position of the dump truck 2 derived by the dead reckoning is corrected by the GPS position detected by the GPS receiver 31 or by the absolute position calculated by the matching navigation position calculation unit 33B. In the following description, the control of the running of the dump truck 2 using the GPS position, which is the detection data from the GPS receiver 31, is appropriately referred to as a GPS running. In addition, the control of the running of the dump truck 2 using the absolute position estimated by the matching navigation position calculation unit 33B is appropriately referred to as a matching navigation running.

The dump truck 2 is provided with the GPS receiver 31 and the laser sensor 24B. The GPS receiver 31 is the position detecting device that detects the GPS position of the dump truck 2. The laser sensor 24B is a non-contact sensor that detects, in a non-contact manner, the running path RP on which the dump truck 2 runs, and the bank BK which is an object at the side of the running path RP. The map data generating unit 33C generates the map data MI of the mine, which is a work site of the dump truck 2, based on the detection data from the GPS receiver 31 and the detection data from the laser sensor 24B. In the present embodiment, the map data generating unit 33C generates the map data MI of the running path RP in the mine including the bank BK based on the detection data from the GPS receiver 31 and the detection data from the laser sensor 24B. The map data generated by the map data generating unit 33C is temporarily stored in the storage unit 33D which is the work area and then, stored in the map-storing database 36. The map data generation processing is performed when the detection accuracy of the GPS position by the GPS receiver 31 exceeds the predetermined accuracy and is high.

The map data generation processing is performed at arbitrary timing. The map data generated in such map generation processing is stored in the map-storing database 36. In the mine, mining operations are performed, and the position or the shape of the loading area LPA, the position or the shape of the discharging area DPA, and the position or the shape of the conveying path HL change day by day. Therefore, there is a high possibility that the old map data MI generated in a predetermined period in the past may be different from the current landform of the mining site. In order to suppress the deviation between the map data MI stored in the map-storing database 36 and the current state of the mining site, the map data generation processing is performed in each of different predetermined periods.

The mining site of the mine is vast. Therefore, the data amount of the map data MI of the mine becomes enormous. In the case where a plurality of map data MI generated in each of a plurality of different periods and stored in the map-storing database 36 is left as it is, the amount of data stored in the map-storing database 36 becomes enormous, making it necessary to increase the capacity of the map-storing database 36.

According to the first embodiment, in the case where past map data generated in the map data generating unit 33C based on the detection data from the GPS receiver 31 and the detection data from the laser sensor 24B acquired in a predetermined period in the past is stored in the map-storing database 36, and where current map data generated currently based on the detection data from the GPS receiver 31 and the detection data from the laser sensor 24B is stored in the storage unit 33D which is the work area, the integrated map data calculation unit 33G calculates the integrated map data by integrating the past map data stored in the map-storing database 36 and the current map data stored in the storage unit 33D. In the matching navigation running, the calculated integrated map data is read into the storage unit 33D. In the matching navigation running, the matching navigation position calculation unit 33B calculates the absolute position of the dump truck 2 by matching the integrated map data read into the storage unit 33D and the detection data from the laser sensor 24B. Based on the absolute position of the dump truck 2 calculated by the matching navigation position calculation unit 33B and the running path RP (course data) set by the processing device 12 and the running path generating device 32, the running controller 20 that functions as a running control unit controls the running of the dump truck 2 so that the dump truck 2 runs in accordance with the set course data.

Moreover, according to the first embodiment, in the case where the map data generation processing is performed in each of different predetermined periods in the past and where the plurality of past map data is stored in the map-storing database 36, when the current map data stored in the storage unit 33D is stored in the map-storing database 36, at least one of the plurality of past map data stored in the map-storing database 36 is deleted.

Figure 9:
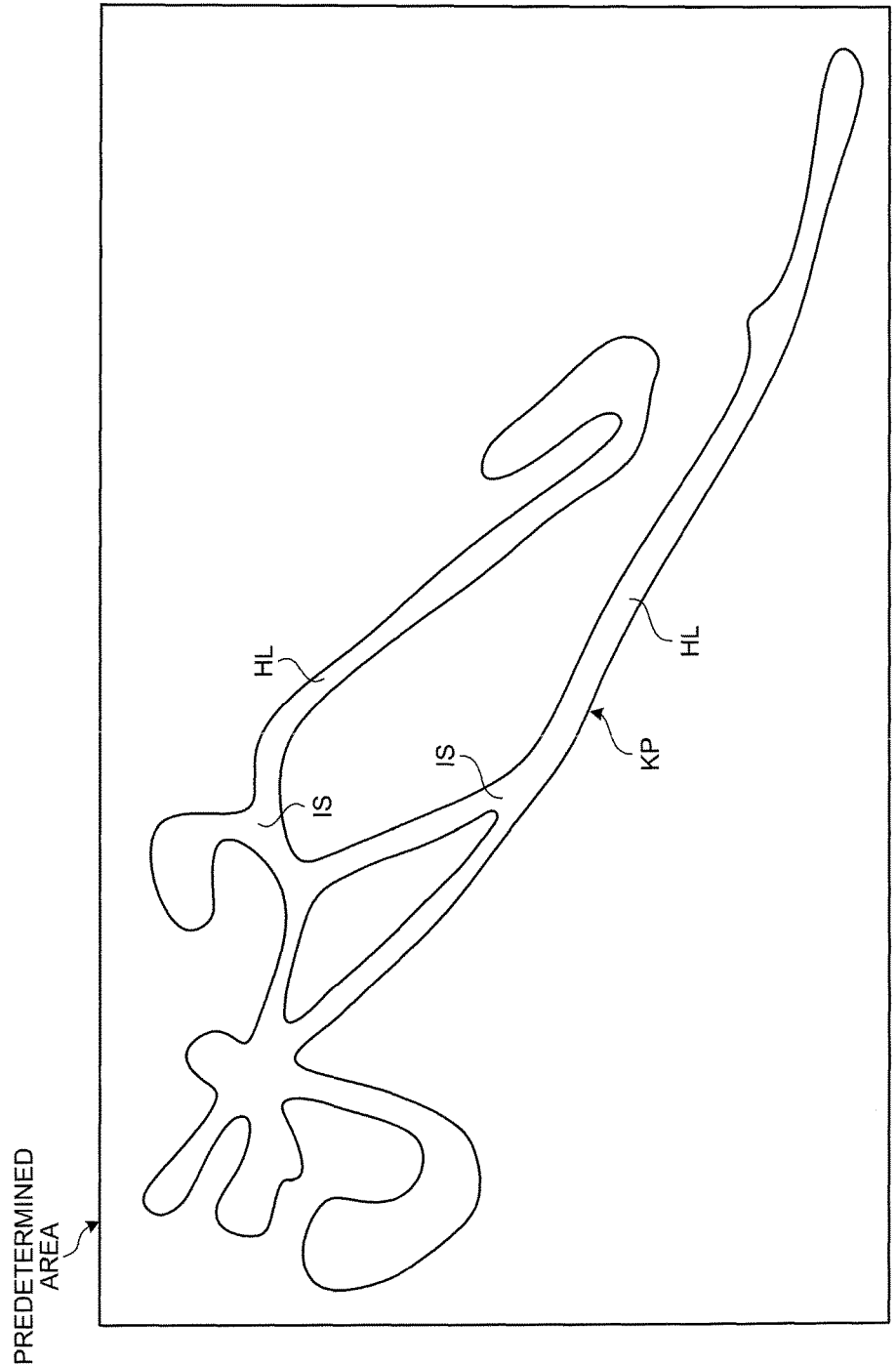
FIG. 9 is a view illustrating an example of a management area according to the first embodiment.

FIG. 9 is a view illustrating an example of a predetermined area in the mining site of the mine. As illustrated in FIG. 9, in the predetermined area, an operating area KP is set where the dump truck 2 can run. The operating area KP includes the loading area LPA, the discharging area DPA, the conveying paths HL, and a plurality of intersections IL. The outer shape of the predetermined area is substantially a square. The dump truck 2 runs in the operating area KP in the predetermined area in order to generate the map data MI of the predetermined area.

Figure 10:
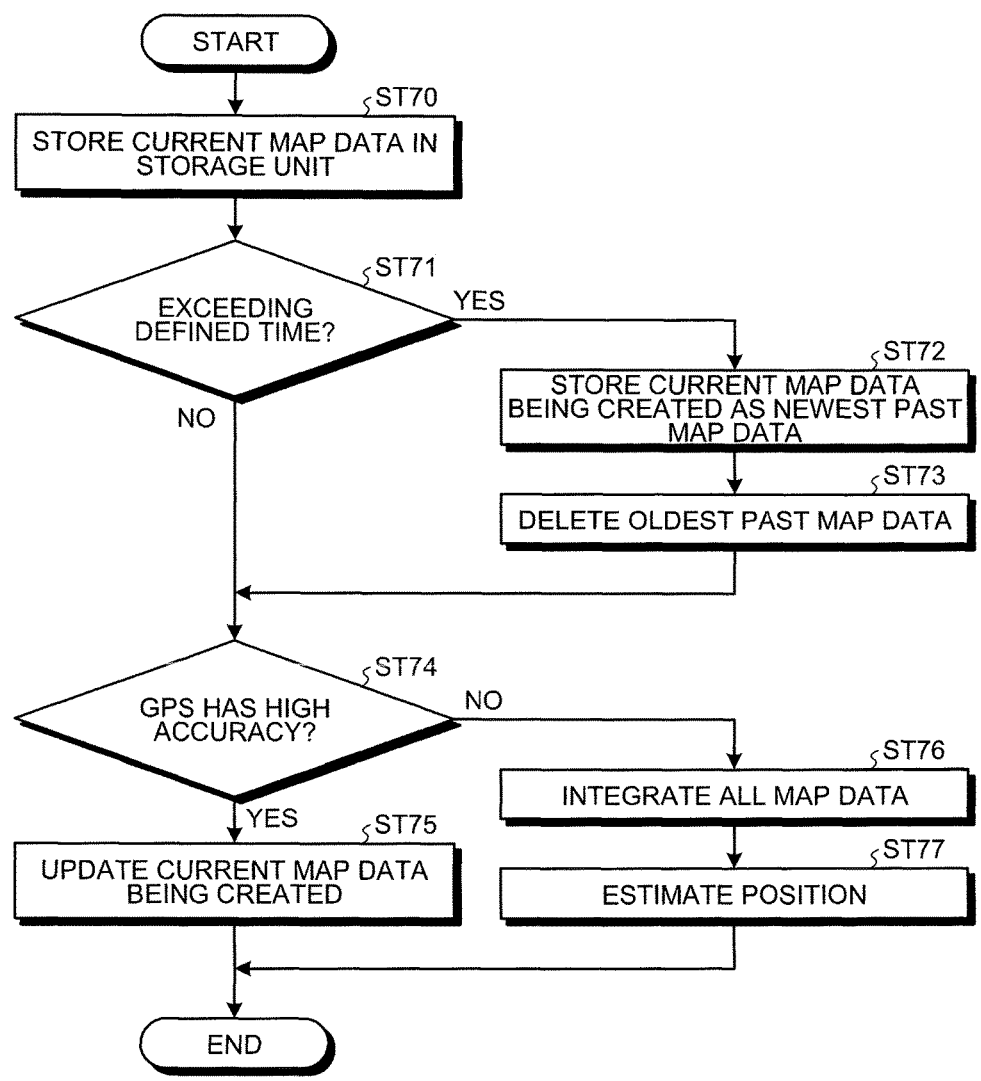
FIG. 10 is a flowchart illustrating management and construction methods for the map data according to the first embodiment.
Figure 11:
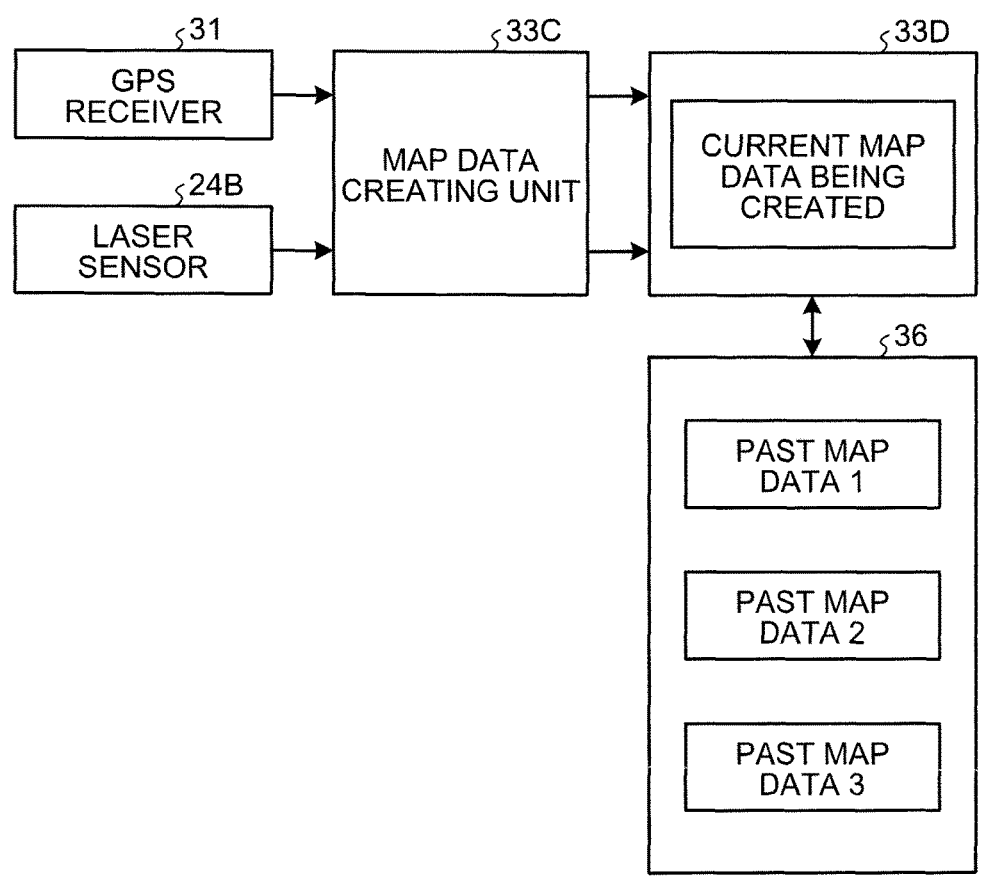
FIG. 11 is a schematic diagram illustrating a position measuring controller according to the first embodiment.
Figure 12:
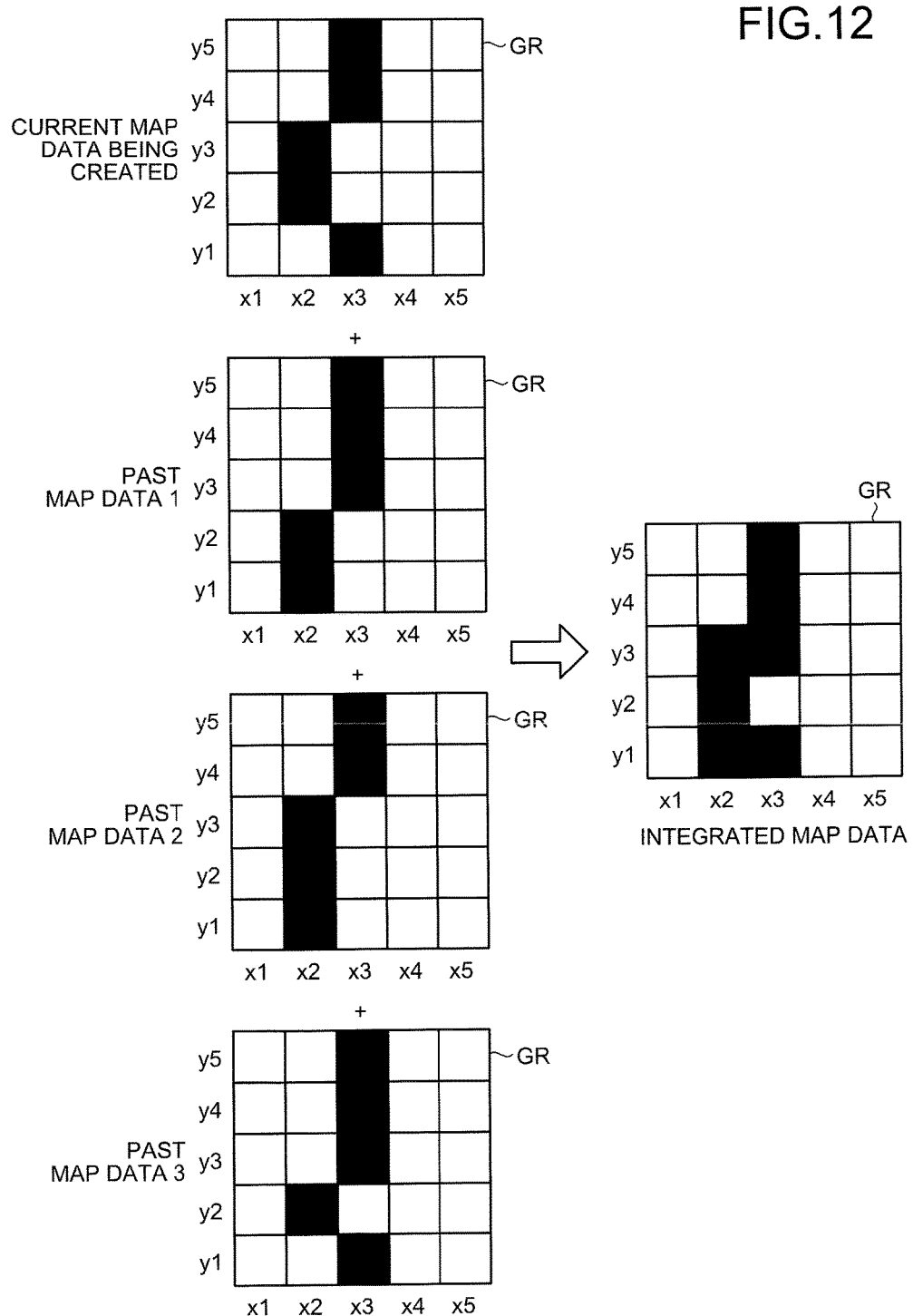
FIG. 12 is a schematic diagram for describing processing of calculating the logical sum of the map data to the first embodiment.

FIG. 10 is a flowchart illustrating an example of management and construction methods for the map data MI according to the first embodiment. FIG. 11 is a schematic diagram for describing the operation of the position measuring controller 33. FIG. 12 is a schematic diagram for describing processing of generating integrated map data.

In the map-storing database 36, a plurality of past map data each generated in a different predetermined period in the past is stored. In the example illustrated in FIGS. 11 and 12, three past map data (past map data 1, past map data 2, and past map data 3) are stored. In the map-storing database 36, each of the plurality of past map data is filed together with time data associated with the predetermined period and thus, managed.

The past map data 1, the past map data 2, and the past map data 3 are map data of the same predetermined area in the mining site which is a work site in the mine. In the first embodiment, among the past map data 1, the past map data 2, and the past map data 3, the past map data 3 is referred to as the oldest data (data generated in an oldest period). In addition, the past map data 1 is referred to as the newest data (data generated in the newest period). Furthermore, the past map data 2 is referred to as the data generated in a period between the period in which the past map data 1 has been generated and the period in which the past map data 3 has been generated.

The running of the dump truck 2 is started, and the map file generation processing is started. The laser sensor 24B detects the bank BK which is at the side of the running path RP while the GPS receiver 31 detects the absolute position of the dump truck 2. The map data generating unit 33C generates the map data of the predetermined area based on the detection data from the GPS receiver 31 and the detection data from the laser sensor 24B. As illustrated in FIG. 11, the current map data being generated is stored in the storage unit (RAM) 33D which is a work area of the position measuring controller 33 (step ST70).

The updating unit 33E determines whether the elapsed time from when the past map data has been generated exceeds a prescribed time (step ST71). Such past map data has been generated in a predetermined period in the past, and stored in the map-storing database 36. In other words, the updating unit 33E determines whether the elapsed time from when each of the past map data 1, the past map data 2, and the past map data 3, stored in the map-storing database 36, has been generated exceeds the prescribed time.

When the past map data, in which the elapsed time from when the past map data has been generated exceeds the prescribed time, is determined to exist in step ST71 (step ST71: Yes), the updating unit 33E stores, in the map-storing database 36, the current map data being generated in the storage unit 33D as the newest past map data (step ST72).

When the current map data of the storage unit 33D is stored in the map-storing database 36, the updating unit 33E deletes at least one of the plurality of past map data stored in the map-storing database 36 (step ST73). In the first embodiment, when the sum of the number of the current map data and the number of the past map data stored in the map-storing database 36 exceeds a predefined value, the updating unit 33E deletes at least one of the plurality of past map data stored in the map-storing database 36, and stores the current map data in the map-storing database 36. In the first embodiment, among the past map data 1, the past map data 2, and the past map data 3 stored in the map-storing database 36, the past map data 3 which is the oldest data is deleted.

On the other hand, when the past map data, in which the elapsed time from when the past map data has been generated exceeds the prescribed time, is determined not to exist in step ST71 (step ST71: No), or when the processing at step ST73 ends, the determination unit 33A determines whether the detection accuracy of the GPS position of the dump truck 2 detected by the GPS receiver 31 is high (step ST74).

When the detection accuracy of the GPS position of the dump truck 2 detected by the GPS receiver 31 is determined to be high (Fix solution) in step ST74 (step ST74: Yes), the map data generation processing continues. The current map data that is being generated and stored in the storage unit 33D is successively updated (step ST75).

On the other hand, when the detection accuracy of the GPS position of the dump truck 2 detected by the GPS receiver 31 is determined not to be high (not Fix solution) in step ST74 (step ST74: No), the matching navigation running is performed.

In the matching navigation running, the integrated map data calculation unit 33G calculates the integrated map data by integrating the past map data stored in the map-storing database 36 and the current map data stored in the storage unit 33D (step ST76). As illustrated in FIG. 11, when the past map data 1, the past map data 2, and the past map data 3 are stored in the map-storing database 36, and when the current map data is stored in the storage unit 33D, the integrated map data calculation unit 33G integrates the current map data, the past map data 1, the past map data 2, and the past map data 3.

As described above, the map data is defined by a plurality of grids GR. The grid GR of the map data includes binary data (one-bit data) that indicates the presence/absence of the bank BK. In the first embodiment, the integration of the past map data and the current map data includes the calculation of the logical sum of the binary data, in the past map data, of the grid GR that indicates a specific position of the predetermined area in the mine, and the binary data, in the current map data, of the grid GR that indicates a specific position of the predetermined area in the mine.

FIG. 12 is a schematic diagram for describing processing of calculating the logical sum of the current map data and the past map data. The current map data, the past map data 1, the past map data 2, and the past map data 3 are each defined by the plurality of grids GR. Coordinate data in the XY-coordinate system is given to each of the plurality of grids GR. The coordinate data of the grid GR indicates the absolute position in the global coordinate system. The current map data, the past map data 1, the past map data 2, and the past map data 3 are the map data of the same predetermined area. Therefore, for example, the coordinate data of the current map data (x1, y1), the coordinate data of the past map data 1 (x1, y1), the coordinate data of the past map data 2 (x1, y1), and the coordinate data of the past map data 3 (x1, y1) indicate the same position. In addition, the coordinate data of the corresponding map data includes the binary data (one-bit data) that indicates the presence/absence of the bank BK.

For example, the current map data includes the binary data, which indicates the presence of the bank BK, in the coordinate data (x3, y1), (x2, y2), (x2, y3), (x3, y4), and (x3, y5). The past map data 1 includes the binary data, which indicates the presence of the bank BK, in the coordinate data (x2, y1) (x2, y2), (x3, y3), (x3, y4), and (x3, y5). The past map data 2 includes the binary data, which indicates the presence of the bank BK, in the coordinate data (x2, y1), (x2, y2), (x2, y3), (x3, y4), and (x3, y5). The past map data 3 includes the binary data, which indicates the presence of the bank BK, in the coordinate data (x3, y1), (x2, y2), (x3, y3), (x3, y4), and (x3, y5).

The logic sum of the current map data, the past map data 1, the past map data 2, and the past map data 3 is the logical sum of the coordinate data that indicates the same position. Therefore, as illustrated in FIG. 12, the integrated map data that indicates the logical sum of the current map data, the past map data 1, the past map data 2, and the past map data 3, includes the binary data, which indicates the presence of the bank BK, in the coordinate data (x2, y1), (x3, y1), (x2, y2), (x2, y3), (x3, y3), (x3, y4), and (x3, y5).

After the integrated map data that indicates the logical sum of the current map data, the past map data 1, the past map data 2, and the past map data 3 is generated, the position calculation unit 33B calculates the absolute position of the dump truck 2 in the predetermined area by matching the integrated map data (logical sum) and the detection data from the laser sensor 24B. The running controller 20 causes the dump truck 2 to perform the matching navigation running based on the position of the dump truck 2 calculated by the position calculation unit 33B and the set course data (step ST77).

<Action and Effect>

As described above, according to the first embodiment, the past map data generated in the predetermined period in the past is stored in the map-storing database 36. In addition, as the map data referred to in the calculation of the absolute position of the dump truck 2 in the matching navigation running, the integrated map data obtained by integrating the past map data stored in the map-storing database 36 and the current map data that is being generated in real time and stored in the storage unit 33D is used. As a result, the appropriate map data corresponding to the change of state in the mining site can be generated and used for the matching navigation running.

Moreover, according to the first embodiment, the logical sum of the current map data and the past map data, which indicates the same predetermined area, is calculated. Accordingly, the reliability of the integrated map data is improved, and the matching navigation running can be accurately performed.

In the mine, the mining operations are performed, and the position or the shape of the loading area LPA, the position or the shape of the discharging area DPA, and the position or the shape of the conveying path HL change day by day. Therefore, the old map data is very likely to deviate from the current state of the mining site. According to the first embodiment, when the current map data generated currently and stored in the storage unit 33D is stored in the map-storing database 36, the oldest past map data among the plurality of past map data stored in the map-storing database 36 is deleted. As a result, the deviation between the past map data stored in the map-storing database 36 and the current state of the mining site is suppressed.

The mining site of the mine is vast. Therefore, the data amount of map data of the mine becomes enormous. In order to manage the enormous data amount of the map data, a large capacity in the map-storing database 36 is required. According to the first embodiment, the old past map data is deleted from the map-storing database 36. Therefore, a massive increase in the amount of data stored in the map-storing database 36 can be suppressed while the newest past map data stored therein is kept.

In the first embodiment, when the plurality of past map data each generated in a different predetermined period in the past is stored in the map-storing database 36, the oldest past map data does not have to be deleted. For example, among the plurality of past map data, past map data evaluated to have the lowest reliability may be deleted. For example, for map data generated in a state in which the dump truck 2 has slipped in the running path RP, the reliability is considered to be low. The reliability of the map data can be evaluated by acquiring, in the map data generation processing, the data that indicates whether the dump truck 2 has slipped at the same time as acquiring the map data.

Other Embodiments

Figure 13:
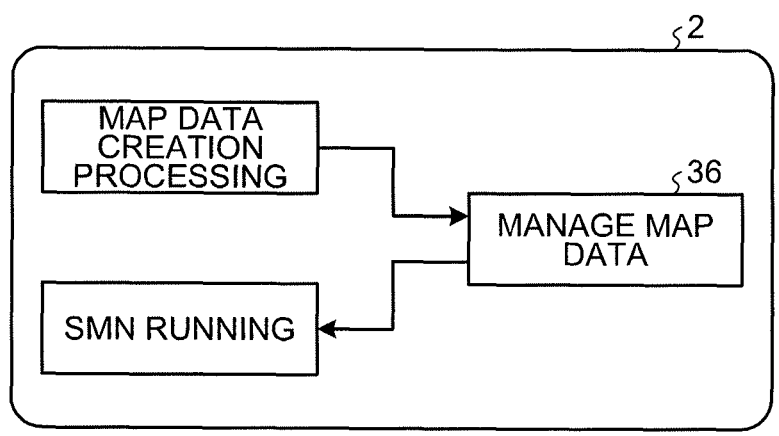
FIG. 13 is a schematic diagram illustrating the configuration of a dump truck 2.
Figure 14:
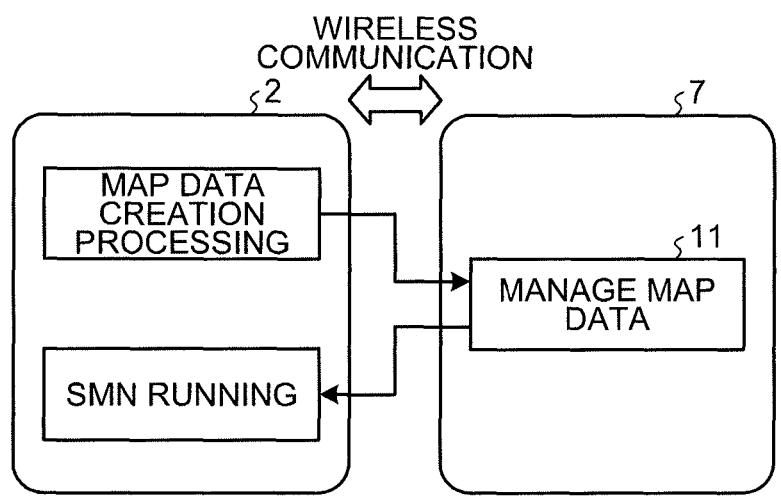
FIG. 14 is a schematic diagram illustrating the configuration of the management system.

In the embodiment described above, as illustrated in a schematic diagram of FIG. 13, the map-storing database 36 is arranged in the dump truck 2. In addition, the map data generated by the map data generation processing is managed in the map-storing database 36 arranged in the dump truck 2, and such map data is used for the matching navigation running. As illustrated in a schematic diagram of FIG. 14, the map-storing database 36 that stores and manages the map data may be provided on the computer 11 of the control facility 7 arranged in a position different from the dump truck 2. For example, the external storage device of the storage device 13 of the computer 11 may function as the map-storing database 36. The map data (past map data) generated by the map data generation processing performed by the dump truck 2 is wirelessly transmitted to the computer 11 of the management facility 7 by the communication system 9. When the dump truck 2 performs matching navigation running, the past map data stored in the external storage device of the storage device 13 of the computer 11 and the current map data currently being generated are integrated to generate the integrated map data.

In the embodiment described above, the detection data from the laser sensor 24B among the non-contact sensor 24 is used during the matching navigation running and for the map data generation processing. However, during the matching navigation running and/or in the map data generation processing, the detection data from the radar 24A among the non-contact sensor 24 may also be used. The non-contact sensor 24 should be any of distance measurement sensors that can measure the position relative to an object around the dump truck 2. For example, a camera that acquires an optical image of the object around the dump truck 2 may be used as the non-contact sensor 24.

In the embodiment described above, each of the plurality of past map data may include positional data of divided areas of the predetermined area. Moreover, in the embodiment described above, the map data indicates the entire predetermined area; however, the management of the map data such as the generation, the storage, and the integration may be performed in each of the divided areas of the predetermined area.

The configurations and elements of the embodiment described above include ones that a person skilled in the art can easily conceive, ones substantially the same, and so-called equivalents. Moreover, the configurations and elements of the embodiment described above can be appropriately combined. Furthermore, a part of the components is sometimes not used.

REFERENCE SIGNS LIST

1 Management system
2 Dump truck (mining machine)
2E Internal combustion engine
2G Generator
2S Steering device
3 Other mining machine
4 Mining machine
5 Positioning satellite
6 Repeater
7 Control facility
9 Communication system
10 Management device
11 Computer
12 Processing device (course data generating unit)
13 Storage device
13B Database
15 Input/output unit
16 Display device
17 Input device
18 Wireless communication device
18A Antenna
19 GPS base station
19A Antenna
19B Transmitting/receiving device
19C Antenna
20 Running controller (running control unit)
21 Vehicle main body
22 Vessel
23 Wheel
23B Braking device
23F Front wheel
23M Electric motor
23R Rear wheel
24 Non-contact sensor
24A Radar
24B Laser sensor
26 Gyro sensor
27 Speed sensor
29 Interface
30 Control system
31 GPS receiver (position detecting device)
31A Antenna
31B Antenna
32 Running path generating device
32A Path position storage unit
33 Position measuring controller
33A Determination unit
33B Matching navigation calculation unit
33C Map data generating unit
33D Storage unit (second storage unit)
33E Updating unit
33F Positional data acquisition unit
33G Integrated map data calculation unit
34 Wireless communication device
34A Antenna
35 First signal line
36 Map-storing database
37A Second communication line
37B Third communication line
38 Observation point coordinate conversion unit
39 Observation point availability determination unit
40 Safety controller
41 Gateway controller
321 Input/output unit
322 Calculation processing device
323 Main storage device (second storage unit)
324 External storage device
325 External storage device (first storage unit)
331 Input/output unit
332 Calculation processing device
333 Main storage device (second storage unit)
334 External storage device
335 External storage device (first storage unit)
BK Bank
CR Crusher
DPA Discharging area
GR Grid
HL Conveying path
IAH Irradiation area
IAV Irradiation area
IS Intersection
KF Kalman filter
LPA Loading area
MI Map data
MIf Specific map data
MIm Management map data
MIp Divided map data
RP Running path

The invention claimed is:

1. A control system for a work machine, comprising:
a position detecting device that detects a position of a work machine that runs on a running path of a work site of a mine of which a current landform changes day by day;
a non-contact sensor that detects, in a non-contact manner, an object at a side of the running path on which the work machine runs;
a map data generating unit that generates map data that indicates a map of a work site based on detection data from the position detecting device and detection data from the non-contact sensor;
a first storage unit that stores a plurality of past map data generated by the map data generating unit based on the detection data from the position detecting device and the detection data from the non-contact sensor acquired at different predetermined periods in a past, each of the plurality of past map data being generated at a different predetermined period;
a second storage unit that stores current map data generated in the map data generating unit based on the detection data from the position detecting device and the detection data from the non-contact sensor;
an integrated map data calculation unit that calculates integrated map data by integrating a predetermined number of past map data from the plurality of the past map data stored in the first storage unit and the current map data stored in the second storage unit, the predetermined number being greater than one; and
a position calculation unit that by matching the integrated map data calculated by the integrated map data calculation unit and the detection data from the non-contact sensor, calculates the position of the work machine.

2. The control system for a work machine according to claim 1, wherein
the past map data and the current map data are each defined by a plurality of grids,
the grids include binary data that indicate a presence/absence of the object, and
the integration of the past map data and the current map data includes calculation of a logical sum of the binary data of the grids that indicate specific positions of the work site in the past map data, and the binary data of the grids that indicate the specific positions of the work site in the current map data.

3. The control system for a work machine according to claim 1, wherein
when the current map data is stored in the first storage unit, at least one of the plurality of past map data stored in the first storage unit is deleted.

4. The control system for a work machine according to claim 3, comprising
an updating unit that, when a sum of the number of the current map data and the number of the past map data stored in the first storage unit exceeds a predefined value, deletes at least one of the plurality of past map data stored in the first storage unit and stores the current map data in the first storage unit.

5. A work machine comprising a control system, the control system including:
a position detecting device that detects a position of a work machine that runs on a running path of a work site of a mine of which a current landform changes day by day;
a non-contact sensor that detects, in a non-contact manner, an object at a side of the running path on which the work machine runs;
a map data generating unit that generates map data that indicates a map of a work site based on detection data from the position detecting device and detection data from the non-contact sensor;
a first storage unit that stores a plurality of past map data generated by the map data generating unit based on the detection data from the position detecting device and the detection data from the non-contact sensor acquired at different predetermined periods in a past, each of the plurality of past map data being generated at a different predetermined period;
a second storage unit that stores current map data generated in the map data generating unit based on the detection data from the position detecting device and the detection data from the non-contact sensor;
an integrated map data calculation unit that calculates integrated map data by integrating a predetermined number of past map data from the plurality of the past map data stored in the first storage unit and the current map data stored in the second storage unit, the predetermined number being greater than one; and
a position calculation unit that by matching the integrated map data calculated by the integrated map data calculation unit and the detection data from the non-contact sensor, calculates the position of the work machine.

6. A management system for a work machine, comprising:
a work machine comprising a control system that includes:
a position detecting device that detects a position of a work machine that runs on a running path of a work site of a mine of which a current landform changes day by day,
a non-contact sensor that detects, in a non-contact manner, an object at a side of the running path on which the work machine runs,
a map data generating unit that generates map data that indicates a map of a work site based on detection data from the position detecting device and detection data from the non-contact sensor,
a first storage unit that stores a plurality of past map data generated by the map data generating unit based on the detection data from the position detecting device and the detection data from the non-contact sensor acquired at different predetermined periods in a past, each of the plurality of past map data being generated at a different predetermined period,
a second storage unit that stores current map data generated in the map data generating unit based on the detection data from the position detecting device and the detection data from the non-contact sensor,
an integrated map data calculation unit that calculates integrated map data by integrating a predetermined number of past map data from the plurality of the past map data stored in the first storage unit and the current map data stored in the second storage unit, the predetermined number being greater than one, and
a position calculation unit that by matching the integrated map data calculated by the integrated map data calculation unit and the detection data from the non-contact sensor, calculates the position of the work machine; and a management device that outputs course data that defines the running path to the work machine.

\* \* \* \* \*